(12) United States Patent
Ye et al.

(10) Patent No.: US 10,817,072 B2
(45) Date of Patent: *Oct. 27, 2020

(54) METHOD AND APPARATUS FOR PERFORMING MOTION RECOGNITION USING MOTION SENSOR FUSION, AND ASSOCIATED COMPUTER PROGRAM PRODUCT

(71) Applicant: CM HK LIMITED, Fortress Hill (HK)

(72) Inventors: Zhou Ye, Taipei (TW); Shun-Nan Liou, Taipei (TW); Ying-Ko Lu, Taipei (TW); Chin-Lung Lee, Taipei (TW)

(73) Assignee: CM HK Limited, Fortress Hill (HK)

( * ) Notice: Subject to any disclaimer, the term of this patent is extended or adjusted under 35 U.S.C. 154(b) by 0 days.

This patent is subject to a terminal disclaimer.

(21) Appl. No.: 16/393,124

(22) Filed: Apr. 24, 2019

(65) Prior Publication Data

US 2019/0250718 A1    Aug. 15, 2019

Related U.S. Application Data

(63) Continuation of application No. 15/613,426, filed on Jun. 5, 2017, now Pat. No. 10,275,038, which is a continuation of application No. 13/762,405, filed on Feb. 8, 2013, now Pat. No. 9,690,386, which is a continuation-in-part of application No. 13/072,794, filed on Mar. 28, 2011, now Pat. No. 9,760,186, and
(Continued)

(51) Int. Cl.
*G06F 3/01* (2006.01)

(52) U.S. Cl.
CPC ................... *G06F 3/017* (2013.01)

(58) Field of Classification Search
CPC ...... G06F 1/1694; G06F 3/017; G06F 1/1626; G06K 9/224; A63F 13/428
See application file for complete search history.

(56) References Cited

U.S. PATENT DOCUMENTS

| 7,089,148 B1 | 8/2006 | Bachmann et al. |
| 7,158,118 B2 | 1/2007 | Liberty |

(Continued)

FOREIGN PATENT DOCUMENTS

| JP | 2009101108 A | 5/2009 |
| JP | 2009119125 A | 6/2009 |
| WO | 2012131166 A1 | 10/2012 |

*Primary Examiner* — Richard J Hong
(74) *Attorney, Agent, or Firm* — McClure, Qualey & Rodack, LLP

(57) ABSTRACT

A method and apparatus for performing motion recognition using motion sensor fusion and an associated computer program product are provided, where the method is applied to an electronic device. The method includes the steps of: utilizing a plurality of motion sensors of the electronic device to obtain sensor data respectively corresponding to the plurality of motion sensors, the sensor data measured at a device coordinate system of the electronic device, wherein the plurality of motion sensors includes inertial motion sensors; and performing sensor fusion according to the sensor data by converting at least one portion of the sensor data and derivatives of the sensor data into converted data based on a global coordinate system of a user of the electronic device, to perform motion recognition based on the global coordinate system, in order to recognize the user's motion.

16 Claims, 40 Drawing Sheets

Related U.S. Application Data a continuation-in-part of application No. 12/943,934, filed on Nov. 11, 2010, now Pat. No. 8,441,438, and a continuation-in-part of application No. 13/164,790, filed on Jun. 21, 2011, now Pat. No. 8,847,880, said application No. 13/072,794 is a continuation-in-part of application No. 12/943,934, filed on Nov. 11, 2010, now Pat. No. 8,441,438, said application No. 13/164,790 is a continuation-in-part of application No. 12/647,397, filed on Dec. 25, 2009, now abandoned.

(60) Provisional application No. 61/292,558, filed on Jan. 6, 2010, provisional application No. 61/225,555, filed on Jul. 14, 2009, provisional application No. 61/597,144, filed on Feb. 9, 2012.

(56) References Cited

U.S. PATENT DOCUMENTS

| | | |
|---|---|---|
| 7,702,608 B1 | 4/2010 | Bererton |
| 8,267,785 B2 | 9/2012 | Yamashita et al. |
| 8,462,109 B2 | 6/2013 | Nasiri et al. |
| 2004/0095317 A1 | 5/2004 | Zhang et al. |
| 2004/0260507 A1 | 12/2004 | Wook et al. |
| 2005/0243062 A1 | 11/2005 | Liberty |
| 2006/0028446 A1 | 2/2006 | Liberty |
| 2006/0182316 A1* | 8/2006 | Bang ............... G06K 9/224 382/122 |
| 2007/0132733 A1 | 6/2007 | Ram |
| 2007/0211025 A1* | 9/2007 | Sato ............... A63F 13/428 345/158 |
| 2007/0299626 A1 | 12/2007 | Song et al. |
| 2009/0184849 A1 | 7/2009 | Nasiri et al. |
| 2009/0262074 A1* | 10/2009 | Nasiri ............... G06F 1/1626 345/158 |
| 2009/0265671 A1 | 10/2009 | Sachs et al. |
| 2010/0033352 A1* | 2/2010 | Chuang ............... G06F 3/017 341/20 |
| 2010/0164807 A1 | 7/2010 | Tseng et al. |
| 2011/0260968 A1 | 10/2011 | Zhou et al. |
| 2012/0007713 A1 | 1/2012 | Nasiri |

\* cited by examiner

METHOD AND APPARATUS FOR PERFORMING MOTION RECOGNITION USING MOTION SENSOR FUSION, AND ASSOCIATED COMPUTER PROGRAM PRODUCT

CROSS REFERENCE TO RELATED APPLICATIONS

This application is a continuation application, which claims the benefit of and priority to U.S. application Ser. No. 15/613,426, filed on Jun. 5, 2017, which is a continuation application, which claims the benefit of and priority to U.S. application Ser. No. 13/762,405, filed on Feb. 8, 2013 (now patented as U.S. Pat. No. 9,690,386, issued Jun. 27, 2017), which claims the benefit of U.S. Provisional Application No. 61/597,144, which was filed on Feb. 9, 2012 and is entitled "Motion Recognition Using Motion Sensor Fusion". The entirety of each of the above-mentioned priority applications is incorporated herein by reference and made a part of this specification. In addition, U.S. application Ser. No. 13/762,405 is a continuation-in-part application of, and claims the benefit of, each of three U.S. patent application Ser. No. 13/072,794 (which was filed on Mar. 28, 2011 and is entitled "ELECTRONIC DEVICE FOR USE IN MOTION DETECTION AND METHOD FOR OBTAINING RESULTANT DEVIATION THEREOF", now patented as U.S. Pat. No. 9,760,186), Ser. No. 12/943,934 (which was filed on Nov. 11, 2010 and is entitled "3D POINTING DEVICE AND METHOD FOR COMPENSATING MOVEMENT THEREOF", now patented as U.S. Pat. No. 8,441,438), and Ser. No. 13/164,790 (which was filed on Jun. 21, 2011 and is entitled "METHOD AND APPARATUS FOR PROVIDING MOTION LIBRARY", now patented as U.S. Pat. No. 8,847,880), where the entirety of each of the above-mentioned three U.S. patent applications is incorporated herein by reference and made a part of this specification. Additionally, the U.S. patent application Ser. No. 13/072,794 is a continuation-in-part application of the U.S. patent application Ser. No. 12/943,934 (now patented as U.S. Pat. No. 8,441,438), and the U.S. patent application Ser. No. 12/943,934 claims the benefit of U.S. Provisional Application No. 61/292,558, which was filed on Jan. 6, 2010, while the U.S. patent application Ser. No. 13/164,790 is a continuation-in-part application of the U.S. patent application Ser. No. 12/647,397, which was filed on Dec. 25, 2009, and the U.S. patent application Ser. No. 12/647,397 claims the benefit of U.S. Provisional Application No. 61/225,555, which was filed on Jul. 14, 2009.

BACKGROUND OF THE INVENTION

1. Field of the Invention

The present invention relates to motion recognition of a portable electronic device, and more particularly, to a method for performing motion recognition using motion sensor fusion, and to an associated apparatus and an associated computer program product.

2. Description of the Prior Art

According to the related art, it seems unlikely that there are sufficient implementation details of conventional motion recognition methods. When trying to apply the conventional motion recognition methods, some problems may occur. For example, regarding the motions respectively shown in FIG. 1 and FIG. 2, such as the swing motion toward the "Right" direction with translation plus rotation with respect to the "−z"-axis and the swing motion toward the "Right" direction with translation plus rotation with respect to the "−z"-axis plus overturning with respect to the "+y"-axis, when only G-sensors are utilized, the change between linear acceleration and gravity acceleration cannot be decoupled. More specifically, referring to FIG. 3 which illustrates the data curves of G-sensor outputs (more particularly, acceleration data ax, ay, and az corresponding to three axes, respectively) for the motions respectively shown in FIG. 1 and FIG. 2, with the upper half and the lower half of FIG. 3 respectively corresponding to FIG. 1 and FIG. 2, although these two motions are in the same direction and have the same translation measurement, they cannot be identified according to the G-sensor outputs. In another example, regarding the motion shown in FIG. 2, when only Gyro sensors are utilized, the translation motion cannot be sensed, where only relative angle can be measured. In another example, regarding the motion shown in FIG. 2, when only magnetic sensors are utilized, the translation motion cannot be sensed, where no angle changes measured according to global coordinate are available. Thus, a novel method is required for providing sufficient implementation details of motion recognition.

SUMMARY OF THE INVENTION

It is therefore an objective of the claimed invention to provide a method for performing motion recognition using motion sensor fusion, and to provide an associated apparatus and an associated computer program product, in order to solve the above-mentioned problems.

It is another objective of the claimed invention to provide a method for performing motion recognition using motion sensor fusion, and to provide an associated apparatus and an associated computer program product, in order to obtain accurate motion recognition results, for the user's convenience during controlling the electronic device.

According to at least one preferred embodiment, a method for performing motion recognition using motion sensor fusion is provided, where the method is applied to an electronic device. The method comprises the steps of: utilizing a plurality of motion sensors of the electronic device to obtain sensor data respectively corresponding to the plurality of motion sensors, the sensor data measured at a device coordinate system of the electronic device, wherein the plurality of motion sensors comprises inertial motion sensors; and performing sensor fusion according to the sensor data by converting at least one portion of the sensor data and derivatives of the sensor data into converted data based on a global coordinate system of a user of the electronic device, to perform motion recognition based on the global coordinate system, in order to recognize the user's motion.

According to at least one preferred embodiment, an associated computer program product having program instructions is provided, where the program instructions are utilized for instructing a processor of an electronic device to perform a method comprising the steps of: utilizing a plurality of motion sensors of the electronic device to obtain sensor data respectively corresponding to the plurality of motion sensors, the sensor data measured at a device coordinate system of the electronic device, wherein the plurality of motion sensors comprises inertial motion sensors; and performing sensor fusion according to the sensor data by converting at least one portion of the sensor data and derivatives of the sensor data into converted data based on a global coordinate system of a user of the electronic device, to perform motion recognition based on the global coordinate system, in order to recognize the user's motion.

According to at least one preferred embodiment, an apparatus for performing motion recognition using motion sensor fusion is also provided, where the apparatus comprises at least one portion of an electronic device. The apparatus comprises a storage module, a motion sensing module, and at least one processor, which is coupled to the storage module and the motion sensing module. The storage module is arranged to store information of at least one database for use of performing motion recognition. In addition, the motion sensing module comprises a plurality of motion sensors positioned within the electronic device, wherein the plurality of motion sensors comprises inertial motion sensors. Additionally, the at least one processor is arranged to execute program instructions to perform a method comprising the steps of: utilizing the plurality of motion sensors of the electronic device to obtain sensor data respectively corresponding to the plurality of motion sensors, the sensor data measured at a device coordinate system of the electronic device; and performing sensor fusion according to the sensor data by converting at least one portion of the sensor data and derivatives of the sensor data into converted data based on a global coordinate system of a user of the electronic device, to perform motion recognition based on the global coordinate system, with aid of the at least one database, in order to recognize the user's motion.

It is one advantage of the present invention that the aforementioned method, the aforementioned apparatus, and the aforementioned computer program product can reach high accuracy during motion recognition. As a result of obtaining accurate motion recognition results, the user can utilize and control the electronic device easily. In addition, the aforementioned method, the aforementioned apparatus, and the aforementioned computer program product allow the user to control the electronic device by utilizing some pre-defined/user-defined gestures of moving the electronic device, having no need to use many finger-touched steps for enabling a specific application (such as a navigation application).

These and other objectives of the present invention will no doubt become obvious to those of ordinary skill in the art after reading the following detailed description of the preferred embodiment that is illustrated in the various figures and drawings.

DETAILED DESCRIPTION

Figure 4:
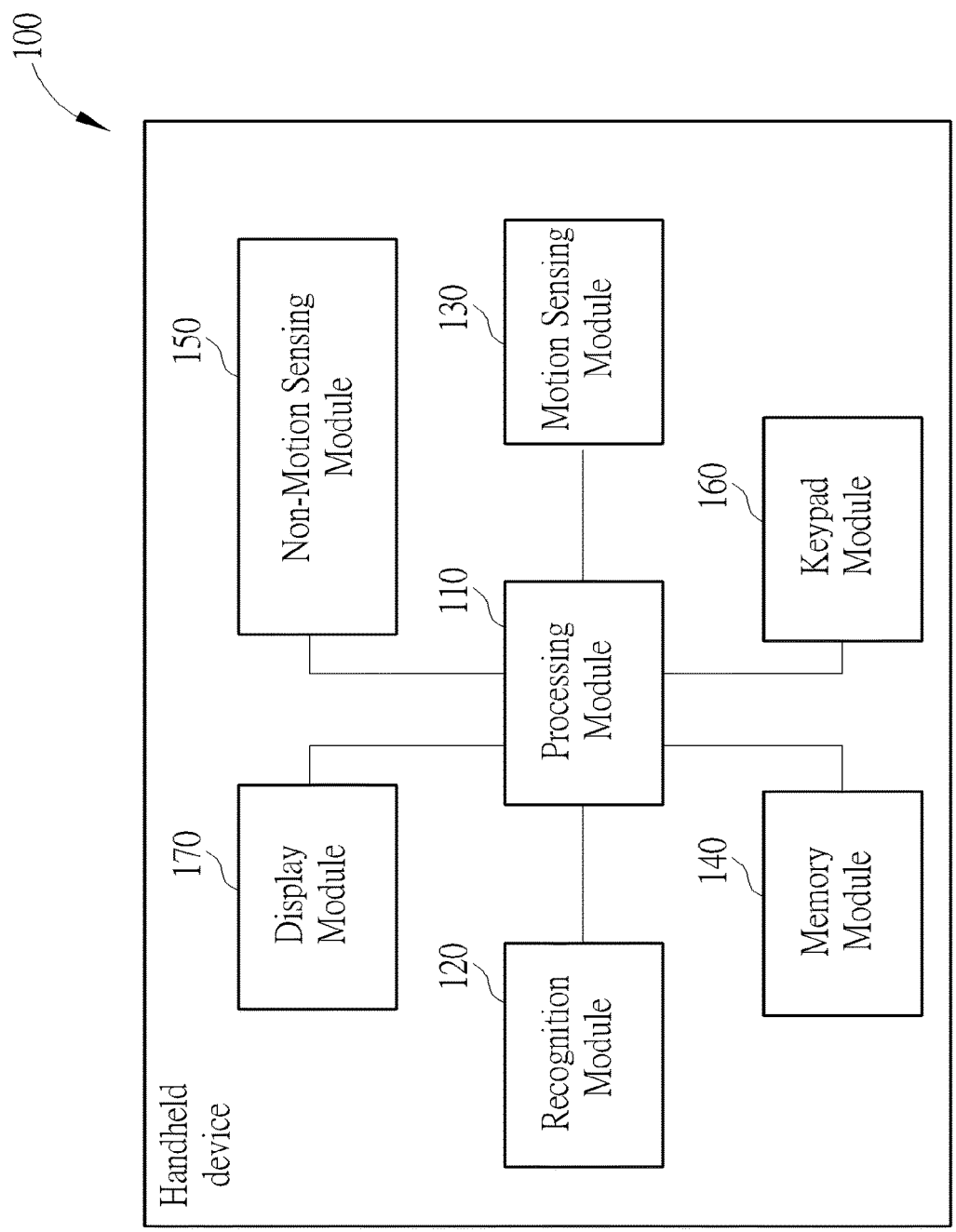
FIG. 4 is a diagram of an apparatus for performing motion recognition using motion sensor fusion according to a first embodiment of the present invention.

Please refer to FIG. 4, which illustrates a diagram of an apparatus 100 for performing motion recognition using motion sensor fusion according to a first embodiment of the present invention, where the apparatus comprises at least one portion (e.g. a portion or all) of an electronic device. For example, the apparatus 100 can be the whole of the electronic device mentioned above. For better comprehension, the apparatus 100 shown in FIG. 4 can be regarded as a handheld device. This is for illustrative purposes only, and is not meant to be a limitation of the present invention. In another example, the apparatus 100 may include a portion of the electronic device mentioned above, and more particularly, can be a control circuit such as an integrated circuit (IC) within the electronic device. Examples of the electronic device may include, but not limited to, a mobile phone (e.g. a multifunctional mobile phone), a mobile computer (e.g. tablet computer), or a personal digital assistant (PDA).

As shown in FIG. 4, the apparatus 100 may include a processing module 110 and a recognition module 120, both of which can be implemented by a processing circuit having at least one processor (e.g. at least one Central Processing Unit (CPU)) executing program instructions of program modules (e.g. software modules), respectively. For example, the program modules may be provided through a computer program product having the aforementioned program instructions, where the computer program product may be implemented as a non-transitory computer-readable medium (e.g. a floppy disk or a compact disc-read only memory (CD-ROM)) storing the program instructions. The apparatus 100 may further include a motion sensing module 130, a storage module such as the memory module 140, a non-motion sensing module 150, a keypad module 160, and a display module 170. In addition, the motion sensing module 130 may include a plurality of motion sensors positioned within the electronic device (e.g. accelerometers, Gyro sensors, and/or compass sensors), where the plurality of motion sensors typically comprises inertial motion sensors. The memory module 140 may include at least one database for storing any kind of final results, raw data and intermediate values during operation of motion recognition. More particularly, the memory module 140 can be implemented by at least one non-volatile memory such as at least one Flash memory, where the aforementioned storage module such as the memory module 140 is arranged to store information of the database for use of performing motion recognition. Additionally, the non-motion sensing module 150 may include at least one of an Radio Frequency (RF) sensor, a camera sensor, and a microphone sensor, while the keypad module 160 may include some keys and/or buttons, for purpose of controlling the electronic device, and the display module 170 can be a touch-sensitive display panel (which can be referred to as the touch panel, for brevity).

According to this embodiment, the processor is arranged to execute the program instructions mentioned above to perform a method for performing motion recognition using motion sensor fusion, where the method may include the steps of: utilizing the plurality of motion sensors of the electronic device to obtain sensor data respectively corresponding to the plurality of motion sensors, the sensor data measured at a device coordinate system (or body coordinate system) of the electronic device; and performing sensor fusion according to the sensor data by converting at least one portion of the sensor data and derivatives of the sensor data into converted data based on a global coordinate system of a user of the electronic device, to perform motion recognition based on the global coordinate system, with aid of the aforementioned at least one database, in order to recognize the user's motion.

For example, the plurality of motion sensors comprises at least one accelerometer (e.g. at least one G-sensor) and at least one rotation sensor (e.g. at least one Gyro sensor), such as three accelerometers and three rotation sensors, and the sensor fusion may comprise six-axis sensor fusion that is accomplished by utilizing the aforementioned at least one accelerometer and the aforementioned at least one rotation sensor. For some implementation details regarding the six-axis sensor fusion mentioned above, please refer to the U.S. patent application Ser. No. 12/943,934 of the above-mentioned three U.S. patent applications.

In another example, the plurality of motion sensors comprises the aforementioned at least one accelerometer (e.g. at least one G-sensor), the aforementioned at least one rotation sensor (e.g. at least one Gyro sensor), and at least one magnetometer (e.g. at least one magnetic sensor), and the sensor fusion may comprise nine-axis sensor fusion that is accomplished by utilizing the aforementioned at least one accelerometer, the aforementioned at least one rotation sensor, and the aforementioned at least one magnetometer. For some implementation details regarding the nine-axis sensor fusion mentioned above, please refer to the U.S. patent application Ser. No. 13/072,794 of the above-mentioned three U.S. patent applications.

In practice, there are multiple methods for implementing at least one portion of the database. For example, for some implementation details regarding the database, please refer to the U.S. patent application Ser. No. 13/164,790 of the above-mentioned three U.S. patent applications.

Figure 1:
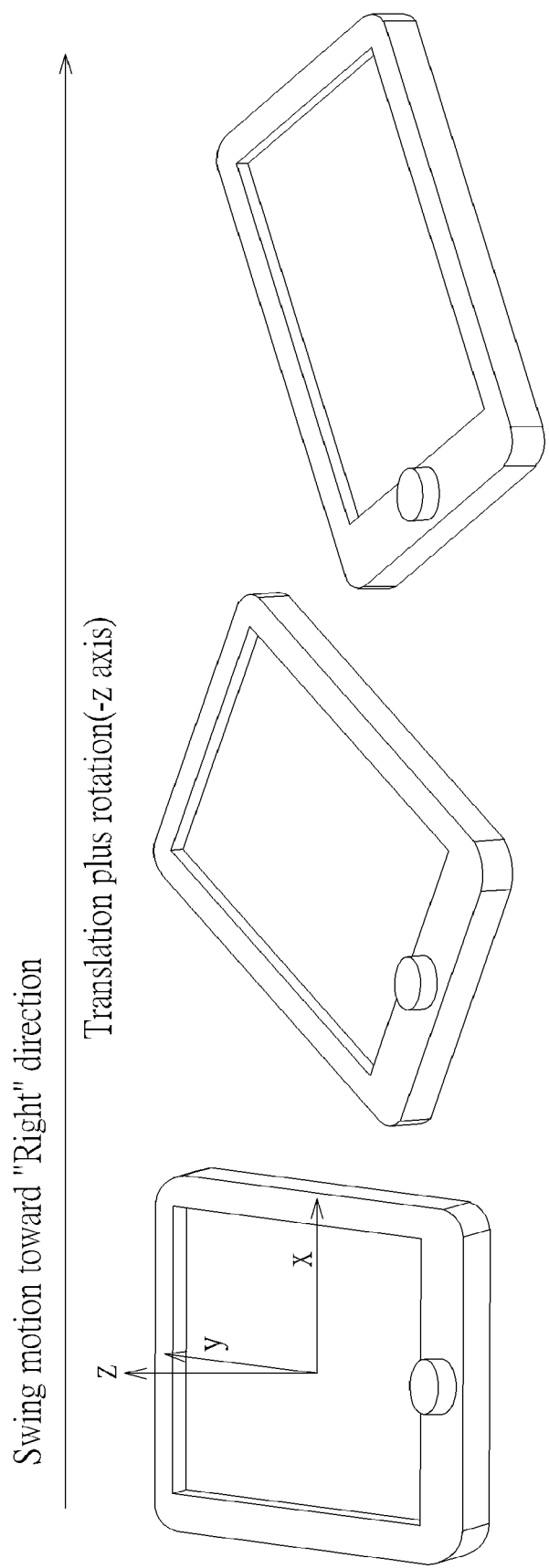
FIG. 1 illustrates a swing motion toward the "Right" direction with translation plus rotation with respect to the "-z"-axis.
Figure 2:
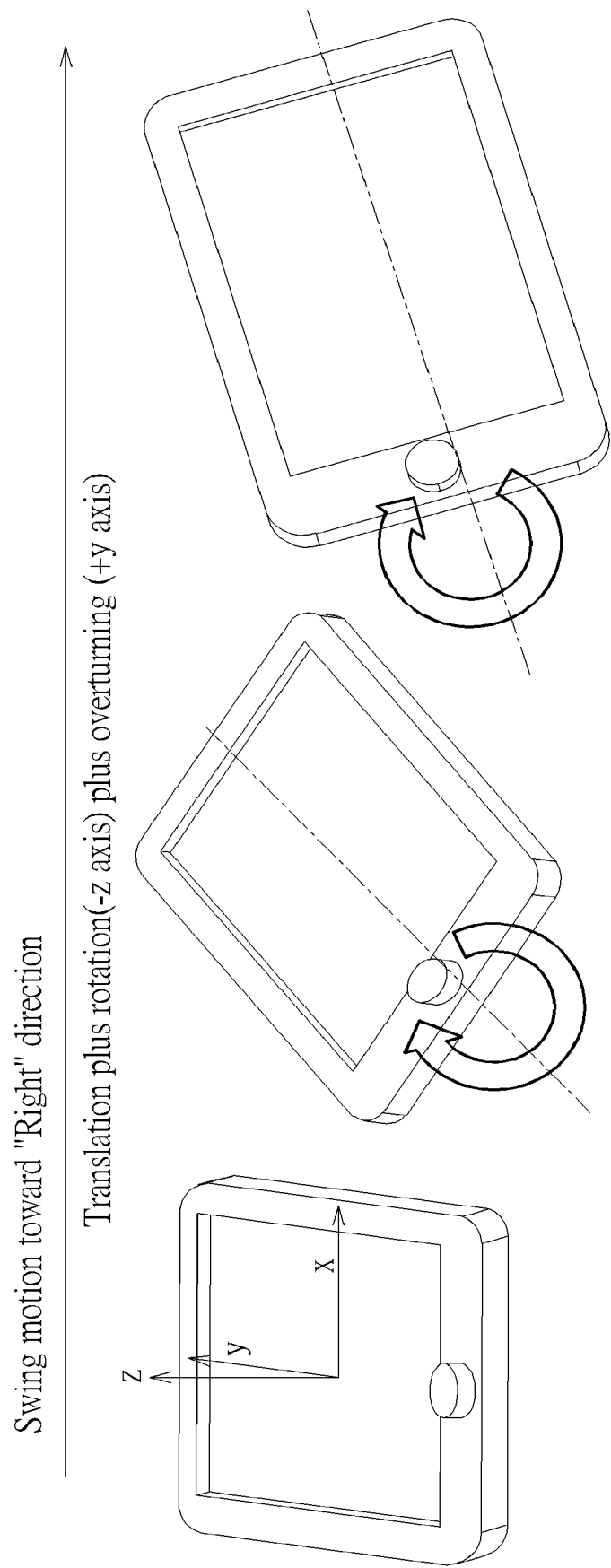
FIG. 2 illustrates a swing motion toward the "Right" direction with translation plus rotation with respect to the "-z"-axis plus overturning with respect to the "+y"-axis.
Figure 3:
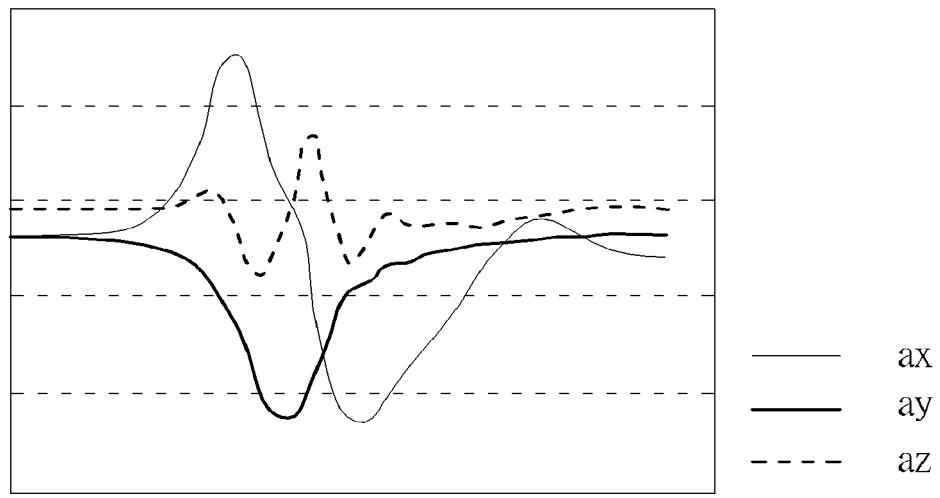
FIG. 3 illustrates some data curves of G-sensor outputs for the motions respectively shown in FIG. 1 and FIG. 2, where the upper half and the lower half of FIG. 3 correspond to the motion shown in FIG. 1 and the motion shown in FIG. 2, respectively.
Figure 3:
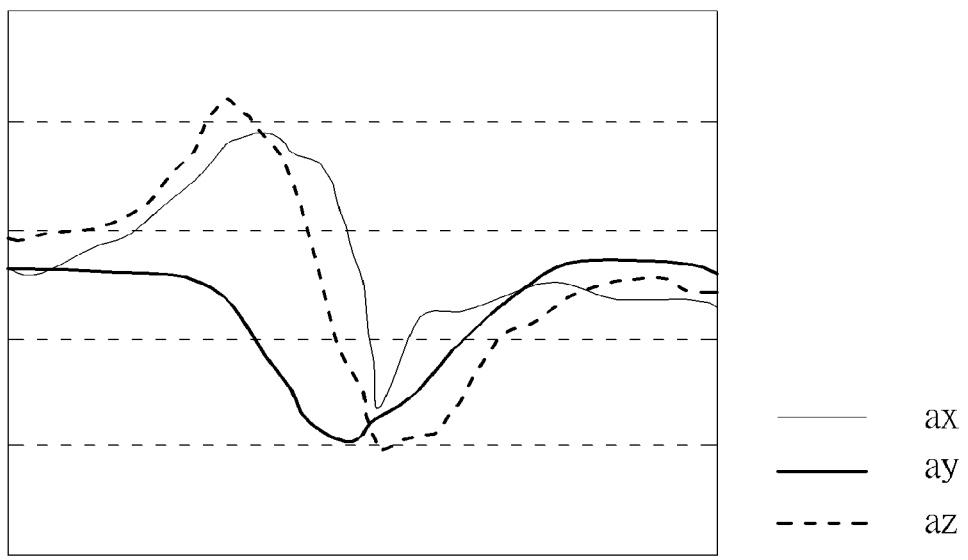

According to a variation of the embodiment shown in FIG. 1, the processor may perform sensor fusion according to the sensor data to obtain motion data based on the device coordinate system and to obtain orientation of the electronic device, such as the orientation based on the global coordinate system, where the motion data based on the device coordinate system comprise linear acceleration based on the device coordinate system. In addition, the processor may convert the motion data based on the device coordinate system into at least one portion of the converted data according to the orientation based on the global coordinate system, where the aforementioned at least one portion of the converted data comprise linear acceleration based on the global coordinate system, and the linear acceleration based on the global coordinate system and the orientation based on the global coordinate system are utilized for sensing linear translation and rotation motion of the electronic device respectively in three-dimensional (3D) space. More particularly, according to the converted data based on the global coordinate system, the processor can perform motion recognition to recognize the user's motion in the 3D space and at least one character drawn by the user in the 3D space. For example, the processor may perform character recognition by mapping the converted data onto at least one predetermined plane of the 3D space to obtain trajectories on the aforementioned at least one predetermined plane, where the aforementioned at least one predetermined plane is parallel to two of three axes of the global coordinate system, and the three axes of the global coordinate system are orthogonal to each other. In a situation where the database comprises a pre-built database, the pre-built database can be utilized for performing character recognition, allowing the user to follow drawing rules corresponding to meaningful characters to be recognized, without need for the user to train the database in advance. This is for illustrative purposes only, and is not meant to be a limitation of the present invention. According to another variation of this embodiment, the processor may load the aforementioned at least one character drawn by the user in the 3D space into a character recognition software module, for performing character recognition.

According to some variations of this embodiment, the orientation based on the global coordinate system comprises a roll angle, a pitch angle, and a yaw angle of the electronic device, and when starting performing character recognition, the processor may align the yaw angle with the user by resetting the yaw angle of the electronic device to be a predetermined value, such as zero or another fixed value. For example, when it is detected that a button of the electronic device is pressed, the processor triggers to reset the yaw angle of the electronic device to be the predetermined value. In another example, when it is detected that force corresponding to beginning of the motion exists, the processor triggers to reset the yaw angle of the electronic device to be the predetermined value.

According to some variations of the embodiment shown in FIG. 1, the database comprises a user-defined gesture database, allowing the user to train the user-defined gesture database with different gestures of moving the electronic device by the user, and the user-defined gesture database is utilized for performing motion recognition and triggering an operation corresponding to a motion recognition result obtained from performing motion recognition. For example, according to the converted data based on the global coordinate system, the processor performs motion recognition to obtain at least one motion recognition result representing the user's motion in the 3D space, where when obtaining the at least one motion recognition result, the processor triggers at least one user-defined macro function corresponding to the at least one motion recognition result. More particularly, in a situation where the user-defined gesture database is provided, the processor allows the user to train the user-defined gesture database with different gestures of moving the electronic device by the user, where the user-defined gesture database is utilized for performing motion recognition and triggering the user-defined macro function corresponding to the at least one motion recognition result.

Figure 5:
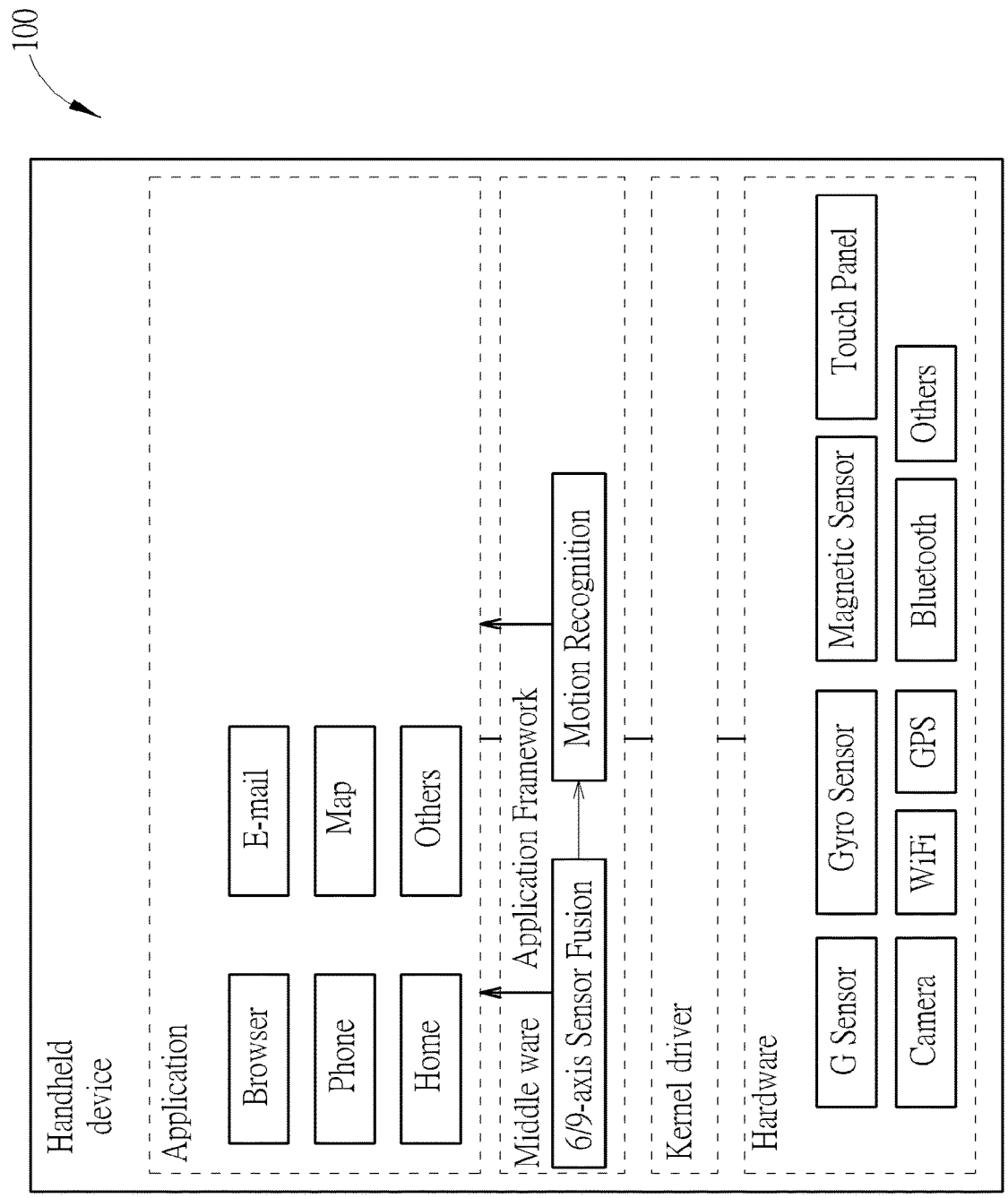
FIG. 5 illustrates a control scheme involved with the apparatus 100 shown in FIG. 4 according to an embodiment of the present invention.

FIG. 5 illustrates a control scheme involved with the apparatus 100 shown in FIG. 4 according to an embodiment of the present invention, where the control scheme is based on Android's platform implemented in the handheld device mentioned above. According to this embodiment, the aforementioned program modules whose program instructions are arranged to be executed by the processor (e.g. CPU) may comprise some applications, some middle-wares, and at least one kernel driver. Examples of the applications may comprise at least one browser, at least one E-mail application, at least one phone application, a map application, a home application, and some other applications. In addition, examples of the middle-wares may comprise at least one application framework, which may comprise at least one six-axis/nine-axis (or 6/9-axis) sensor fusion module for performing the six-axis sensor fusion and/or the nine-axis sensor fusion and may further comprise a motion recognition module (more particularly, the recognition module 120 shown in FIG. 1), where some algorithms of motion recognition are provided for the API which is called by the applications. In practice, in addition to the processor, the handheld device (more particularly, the apparatus 100) may comprise other types of hardware, such as G-sensors, Gyro sensors, magnet sensors, at least one touch panel, at least one camera, a Wireless Fidelity (Wi-Fi) module, a Global Positioning System (GPS) module, a Bluetooth module, and some other modules.

Figure 6:
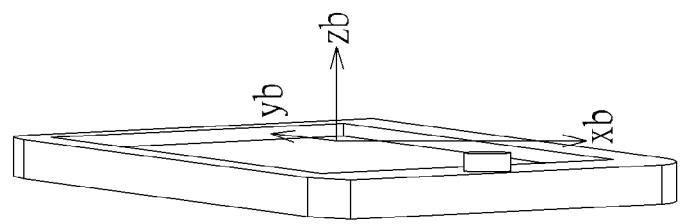
FIG. 6 illustrates a global coordinate system and a device coordinate system involved with a method mentioned in the embodiment shown in FIG. 4.
Figure 6:
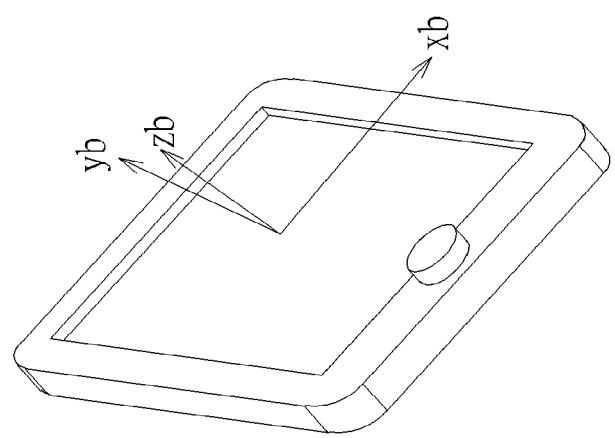
Figure 6:
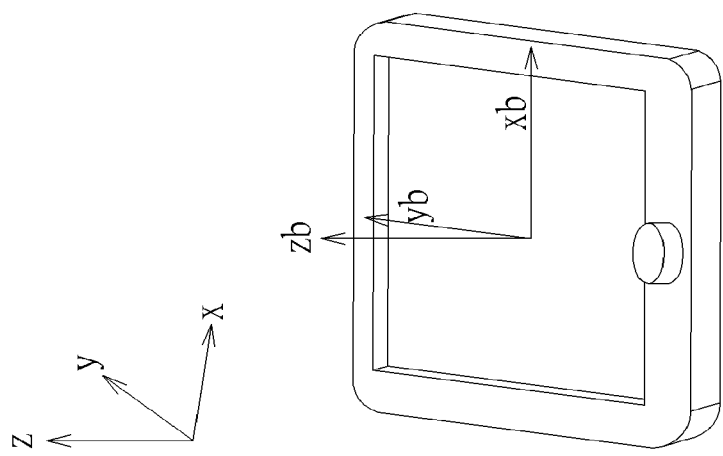

Translation and Rotation Parameters Based on 6-Axis(G+Gyro)/9-Axis(G+Gyro+M) Sensor Fusion in Application of Motion Recognition FIG. 6 illustrates the global coordinate system of the user of the electronic device and the device coordinate system (or body coordinate system) involved with the method mentioned in the embodiment shown in FIG. 4. As shown in FIG. 6, the global coordinate system (i.e. the x-y-z coordinate system, whose three axes x, y, and z are orthogonal to each other) remains fixed in the 3D space, while the device coordinate system (i.e. the xb-yb-zb coordinate system, whose three axes xb, yb, and zb are orthogonal to each other) remains fixed on the electronic device under consideration.

Figure 7:
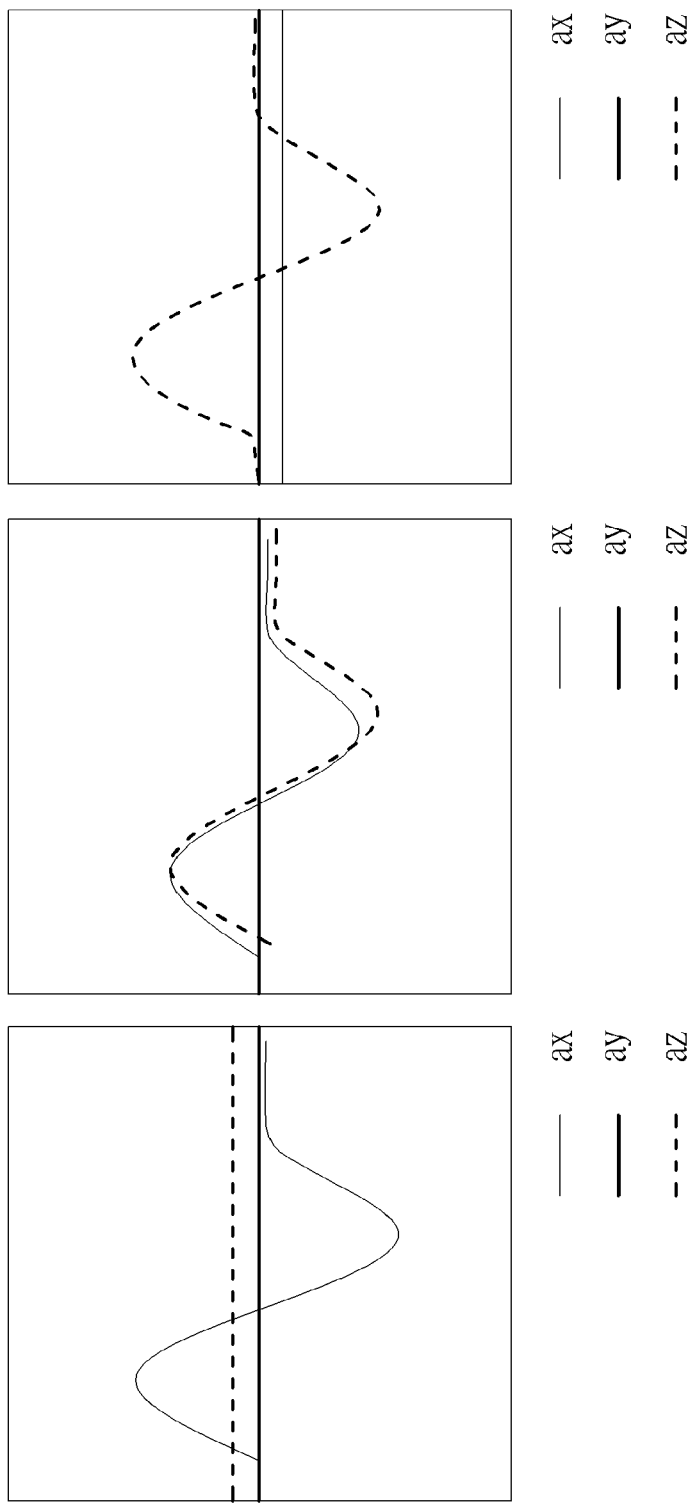
FIG. 7 illustrates some data curves of G-sensor outputs for the same motion carried out by the user with the electronic device being held at different tile angles such as those shown in FIG. 6 according to an embodiment of the present invention.

FIG. 7 illustrates some data curves of G-sensor outputs for the same motion carried out by the user (more particularly, the motion of the translation toward the "Right" direction in FIG. 6) with the electronic device being held at different tile angles such as those shown in FIG. 6 according to an embodiment of the present invention, where the leftmost, the central, and the rightmost sets of data curves shown in FIG. 7 correspond to the three different tile angles shown in FIG. 6 (more particularly, the tile angles illustrated with the leftmost, the central, and the rightmost portion of FIG. 6), respectively. In each set of the leftmost, the central, and the rightmost sets of data curves shown in FIG. 7, there are three curves of the acceleration data ax, ay, and az corresponding to the three axes xb, yb, and zb of the device coordinate system, respectively. As shown in FIG. 7, the three consecutive states of the motion shown in FIG. 6 may cause different sensing signal responses, respectively. For example, referring to the leftmost set of data curves shown in FIG. 7, the acceleration data ax may be non-zero, the acceleration data ay may remain zero, and the acceleration data az may remain constant. In another example, referring to the central set of data curves shown in FIG. 7, the acceleration data ax and az may be non-zero, and the acceleration data ay may remain zero. In another example, referring to the rightmost set of data curves shown in FIG. 7, the acceleration data az may be non-zero, the acceleration data ay may remain zero, and the acceleration data ax may remain constant. Thus, the acceleration sensed by the G-sensors (more particularly, sensed according to the device coordinate system only) will differ from those with different tilt angles. In order to capture full movement measurements of some object moving in the 3D space, it's necessary to obtain both translational and rotational parameters of the object. By performing the six-axis sensor fusion and/or the nine-axis sensor fusion, it can be realized.

Figure 8:
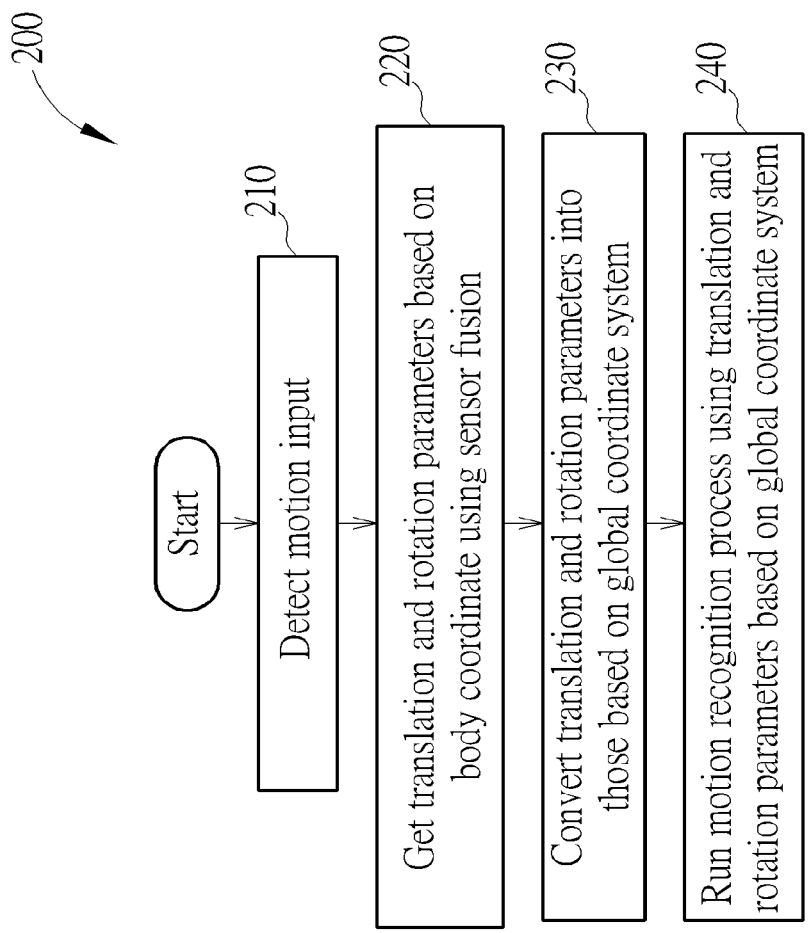
FIG. 8 is a working flow of the method mentioned in the embodiment shown in FIG. 4 according to an embodiment of the present invention.

Please refer to FIG. 8, which illustrates a working flow 200 of the method mentioned in the embodiment shown in FIG. 4 according to an embodiment of the present invention.

In Step 210, the processor detects motion inputs from the plurality of motion sensors, where the motion inputs may comprise the acceleration data ax, ay, and az of the motion under consideration.

In Step 220, the processor gets translation and rotation parameters based on body coordinate (more particularly, the body coordinate system) using sensor fusion (e.g. the six-axis sensor fusion and/or the nine-axis sensor fusion).

In Step 230, the processor converts translation and rotation parameters into those based on the global coordinate system.

In Step 240, the processor runs a motion recognition process using translation and rotation parameters based on the global coordinate system.

According to this embodiment, the translation parameters can be calculated according to the data outputs of the motion sensors by using sensor fusion. As a result, the linear acceleration based on the global coordinate system can be obtained. In addition, the rotation parameters can be calculated according to the data outputs of the motion sensors by using sensor fusion. As a result, the roll, the yaw, and the pitch angles of the orientation of the electronic device can be obtained. Please note that the two sets of parameters (i.e. the translation parameters and the rotation parameters) can be combined as the basic motion inputs used for motion recognition.

Figure 9:
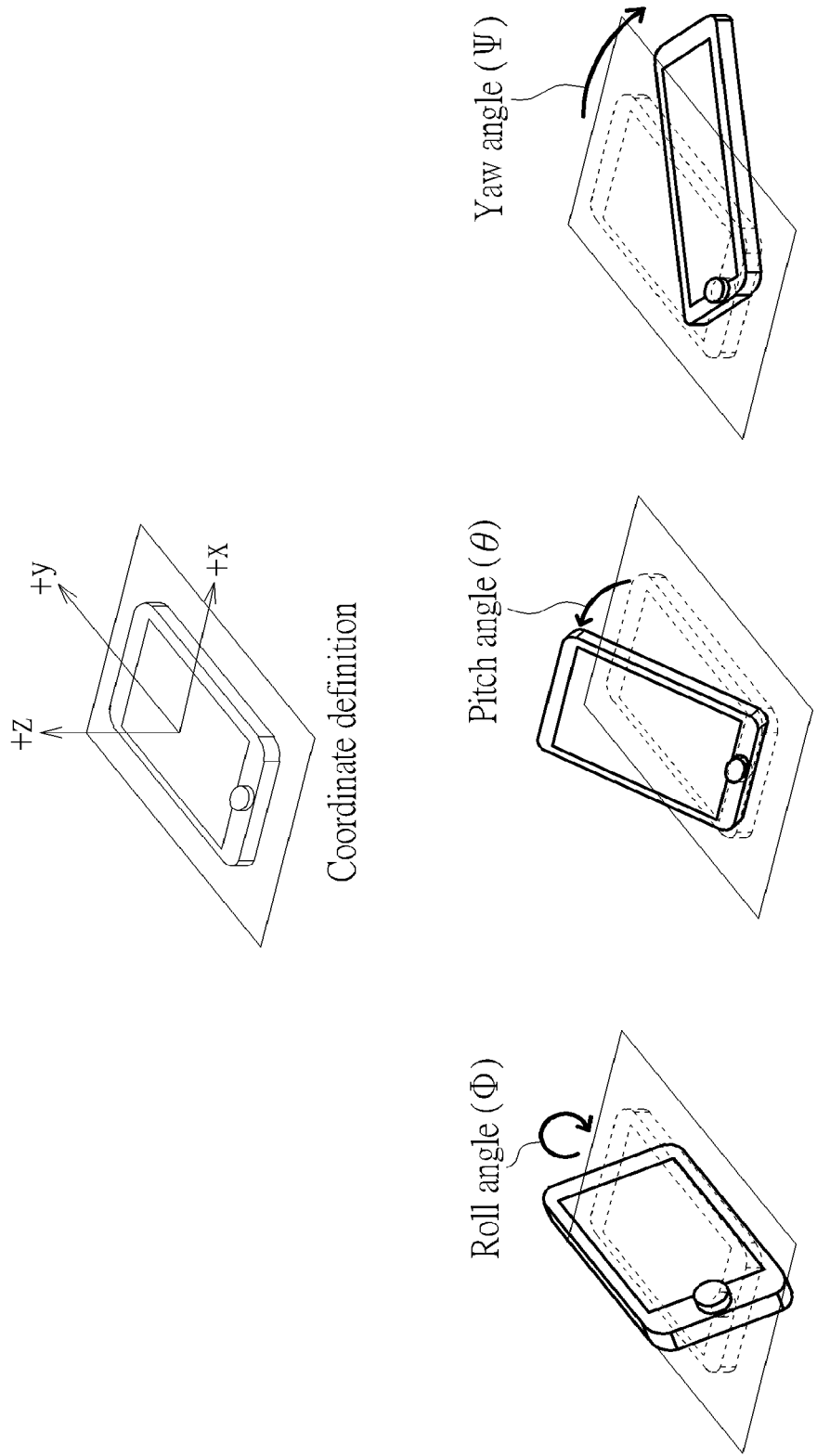
FIG. 9 illustrates the coordinate definition of the global coordinate system mentioned in the embodiment shown in FIG. 6 and the associated roll angle, the associated pitch angle, and the associated yaw angle.

FIG. 9 illustrates the coordinate definition of the global coordinate system mentioned in the embodiment shown in FIG. 6 and the associated roll angle (.PHI.), the associated pitch angle (.theta.), and the associated yaw angle (.PSI.). The orientation obtained by one of some sensor fusion algorithms of the method mentioned in the embodiment shown in FIG. 4 can be represented by a combination of the roll angle (.PHI.), the pitch angle (.theta.), and the yaw angle (.PSI.), where the directions of the "+x"-axis, the "+y"-axis, and the "+z"-axis of the global coordinate system are defined as shown in FIG. 9, and can be utilized for defining the roll angle (.PHI.), the pitch angle (.theta.), and the yaw angle (.PSI.) with respect to the global coordinate system.

Figure 10:
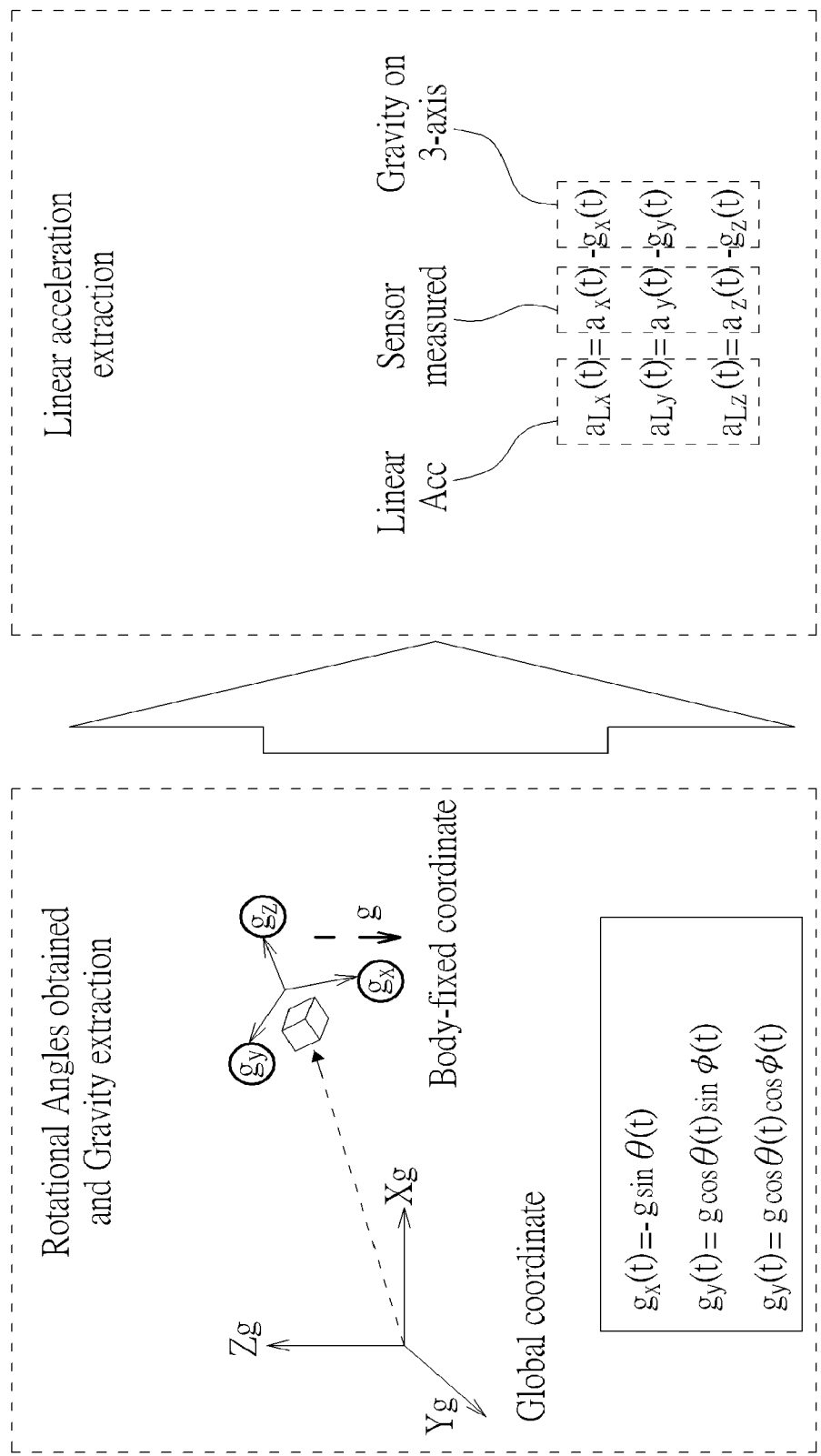
FIG. 10 illustrates some implementation details of obtaining the linear acceleration and rotation angles by using one of some sensor fusion algorithms of the method mentioned in the embodiment shown in FIG. 4 according to another embodiment of the present invention.

FIG. 10 illustrates some implementation details of obtaining the linear acceleration and rotation angles by using one of some sensor fusion algorithms of the method mentioned in the embodiment shown in FIG. 4 according to another embodiment of the present invention. The Xg-Yg-Zg coordinate system can be taken as an example of the global coordinate system mentioned in the embodiment shown in FIG. 6. Please note that the respective components g.sub.x, g.sub.y, and g.sub.z of the gravity vector g shown in the left half of FIG. 10 can be written as the functions of time t, such as the functions g.sub.x(t), g.sub.y(t), and g.sub.z(t) listed around the bottom left corner of FIG. 10. As shown in the right half of FIG. 10, the acceleration measured by the motion sensing module 130 based on the device coordinate system can be written as a set of functions a.sub.x(t), a.sub.y(t), and a.sub.z(t) (more particularly, the vector [a.sub.x(t), a.sub.y(t), a.sub.z(t)]), and the linear acceleration of the electronic device based on the device coordinate system can be written as a set of functions a.sub.Lx(t), a.sub.Ly(t), and a.sub.Lz(t) (more particularly, the vector [a.sub.Lx(t), a.sub.Ly(t), a.sub.Lz(t)]). According to this embodiment, the processor converts the acceleration measured by the motion sensing module 130 based on the device coordinate system (e.g. the vector [a.sub.x(t), a.sub.y(t), a.sub.z(t)]) into the linear acceleration of the electronic device based on the device coordinate system (e.g. the vector [a.sub.Lx(t), a.sub.Ly(t), a.sub.Lz(t)]) according to the functions g.sub.x(t), g.sub.y(t), and g.sub.z(t) listed around the bottom left corner of FIG. 10.

More particularly, the roll, yaw and pitch angles of the orientation of the electronic device are calculated based on the global coordinate system, and at least one portion of the roll, the yaw and the pitch angles of the orientation can be utilized for calculating the linear acceleration of the electronic device based on the device coordinate system (or body coordinate system) of the electronic device such as the handheld device (e.g. the mobile phone mentioned above), where within the functions g.sub.x(t), g.sub.y(t), and g.sub.z(t) listed around the bottom left corner of FIG. 10, the functions g.sub.y(t) and g.sub.z(t) depend on the roll angle, and the functions g.sub.x(t), g.sub.y(t), and g.sub.z(t) depend on the pitch angle.

In practice, the linear acceleration based on the global coordinate system can be calculated by the coordinate transformation relationship represented by a rotation matrix [R].sub.3.times.3, and the linear acceleration based on the global coordinate system, such as the vector a.sub.GLOBAL (t) whose components are a.sub.GLOBALx(t), a.sub.GLOBALy(t), and a.sub.GLOBALz(t) (i.e. the vector [a.sub.GLOBALx(t), a.sub.GLOBALy(t), a.sub.GLOBALz(t)]), is equivalent to the linear acceleration based on the device coordinate system, such as the vector a.sub.L(t) whose components are a.sub.Lx(t), a.sub.Ly(t), and a.sub.Lz(t) (i.e. the vector [a.sub.Lx(t), a.sub.Ly(t), a.sub.Lz(t)]), multiplied by the rotation matrix $[R]_{3\times 3}$. That is, the conversion of the linear acceleration can be performed according to the following equation:

$$a._{GLOBAL}(t)=a._L(t)*[R]_{3\times 3};$$

where the rotation matrix $[R]_{3\times 3}$ can be a function f(.PHI., .theta., .PSI.) of the roll, the pitch, and the yaw angles (i.e. .PHI., .theta., and .PSI., respectively). More particularly, the rotation matrix $[R]_{3\times 3}$ can be expressed as follows:

$$[R]3.\text{times}.3=[\cos .\text{theta}. \cos .\text{psi}.-\cos .\text{phi}. \sin .\text{psi}.\\ \sin .\text{theta}. \cos .\text{theta}. \sin .\text{psi}.+\cos .\text{phi}. \cos .\text{psi}.\\ \sin .\text{theta}. \sin .\text{theta}. \sin .\text{phi}.-\sin .\text{theta}.\\ \cos .\text{psi}.-\cos .\text{phi}. \sin .\text{psi}. \cos .\text{theta}.-\sin .\text{theta}.\\ \sin .\text{psi}.+\cos .\text{phi}. \cos .\text{psi}. \cos .\text{theta}. \cos .\text{theta}.\\ \sin .\text{phi}. \sin .\text{phi}. \sin .\text{psi}.-\sin .\text{phi}. \cos .\text{psi}.\\ \cos .\text{phi}.];$$

EQU00001## where .PHI. is the roll angle, .theta. is the pitch angle, and .PSI. is the yaw angle.

Figure 11:
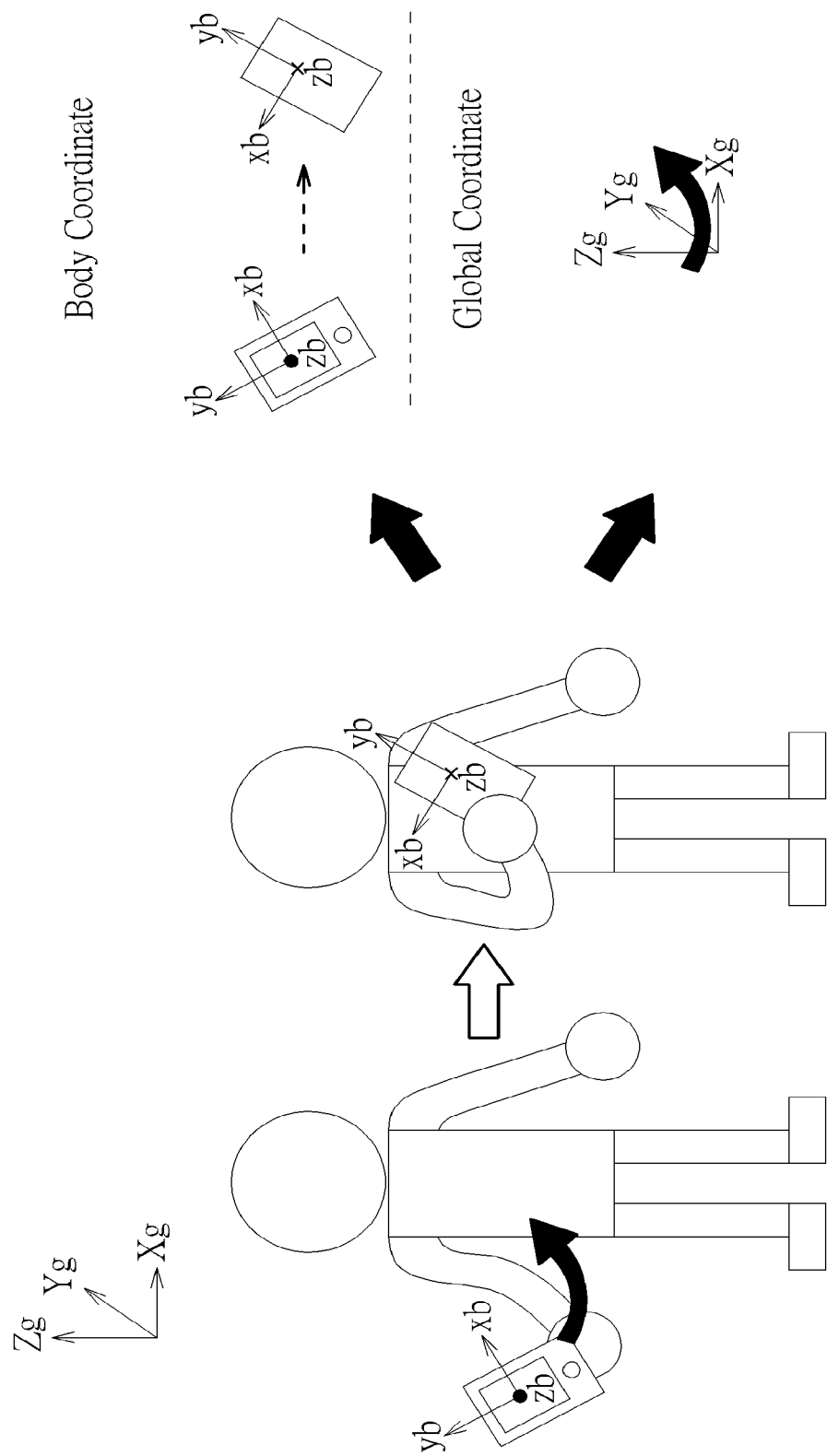
FIG. 11 illustrates the user's motion and the associated relationships in the body coordinate system and the global coordinate system according to an embodiment of the present invention.

FIG. 11 illustrates the user's motion and the associated relationships in the body coordinate system (or device coordinate system) and the global coordinate system according to an embodiment of the present invention, with the body coordinates mapping to the global coordinates. According to this embodiment, one motion is generated by the user and the motion outputs (e.g. the linear acceleration and orientation) reference to the global coordinate are all in the same coordinate system of the user (i.e. the global coordinate system). In addition, the whole motion can be analyzed and recognized correctly based on the same coordinate system of the user (i.e. the global coordinate system).

Figure 12:
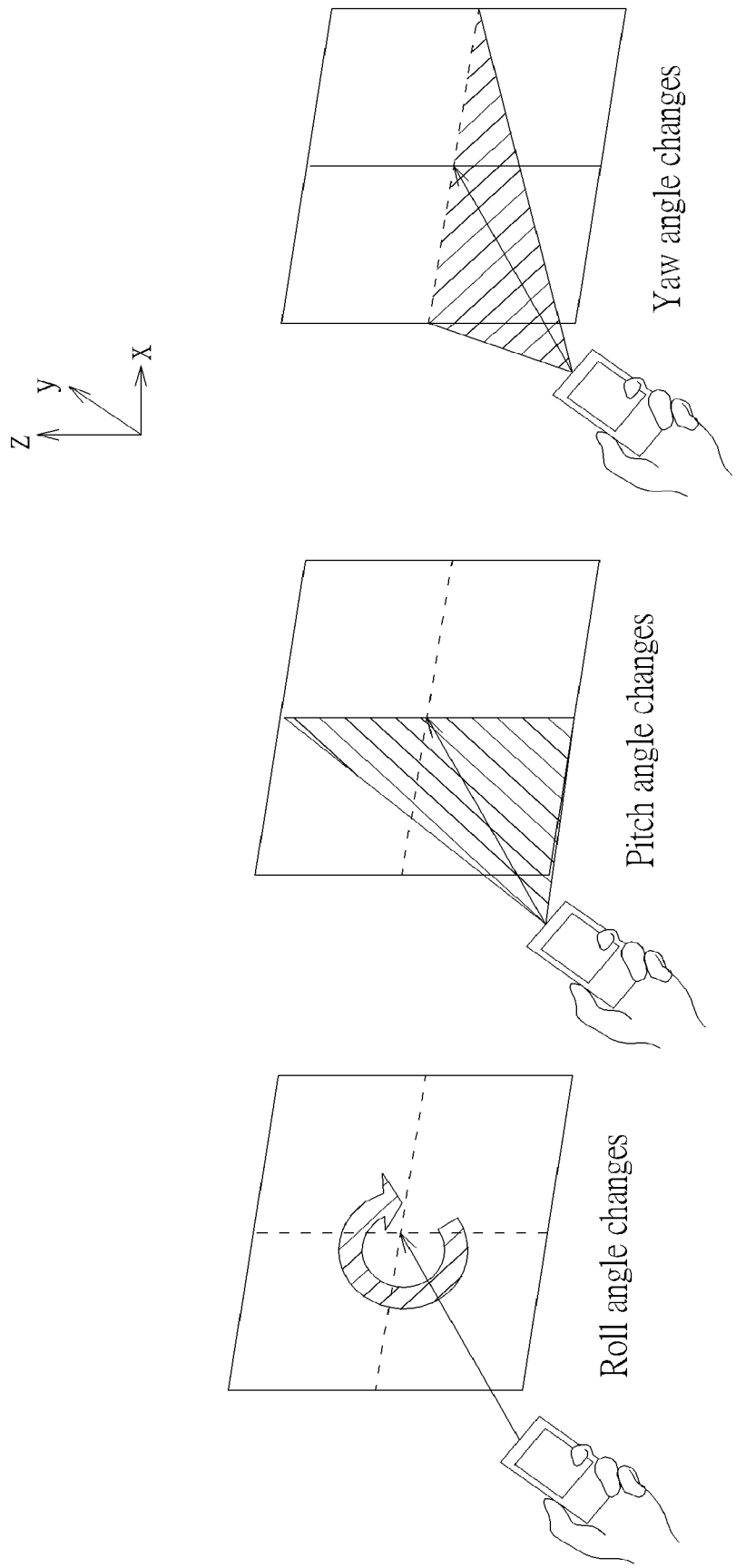
FIG. 12 illustrates some motions carried out and detected referring to the global coordinate system according to an embodiment of the present invention.

FIG. 12 illustrates some motions carried out and detected referring to the global coordinate system according to an embodiment of the present invention. As shown in FIG. 12, in order to perform motion recognition based on the global coordinate system, the processor is arranged to detect the changes in the roll, yaw and pitch angles, respectively. For example, the processor detects that one of the motions shown in FIG. 12 causes the change of the roll angle, and detects that another of the motions shown in FIG. 12 causes the change of the pitch angle, and further detects that the other of the motions shown in FIG. 12 causes the change of the yaw angle.

Figure 13:
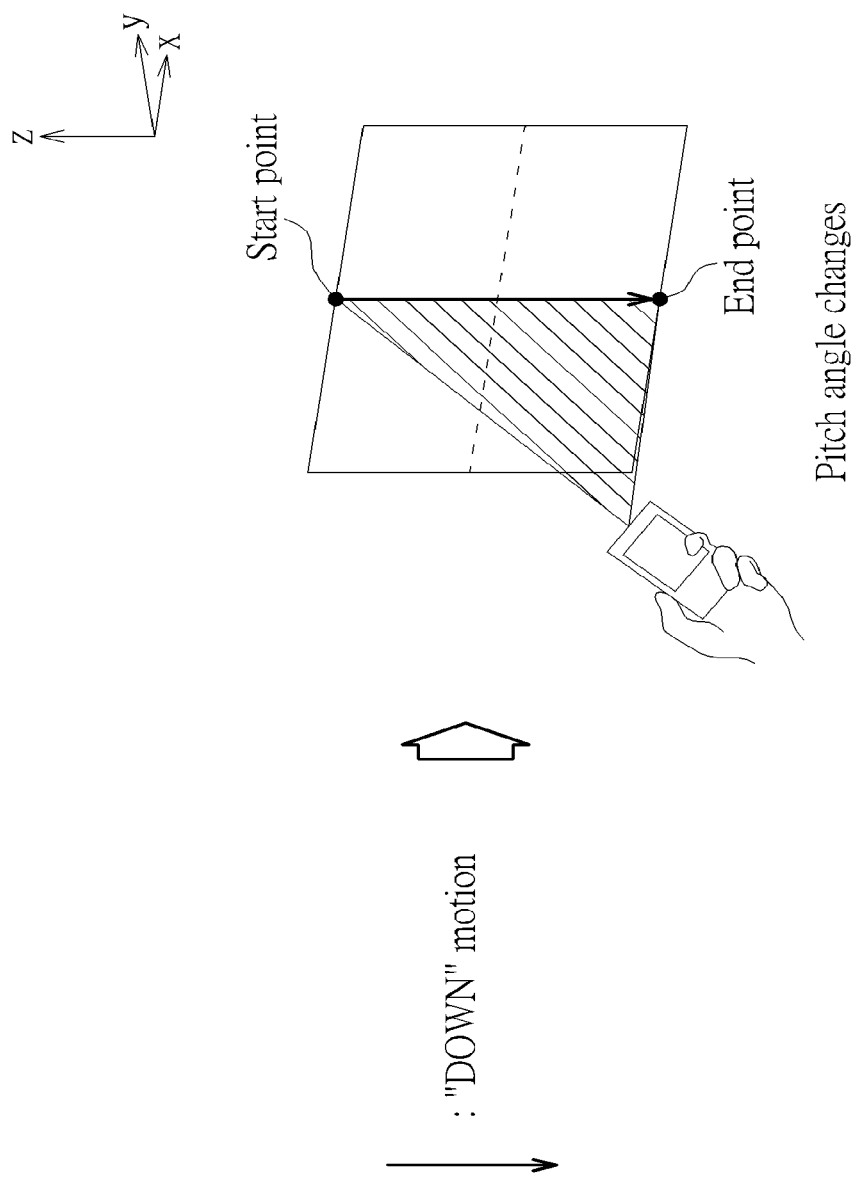
FIG. 13 illustrates a certain motion generated referring to the global coordinate system according to another embodiment of the present invention.
Figure 14:
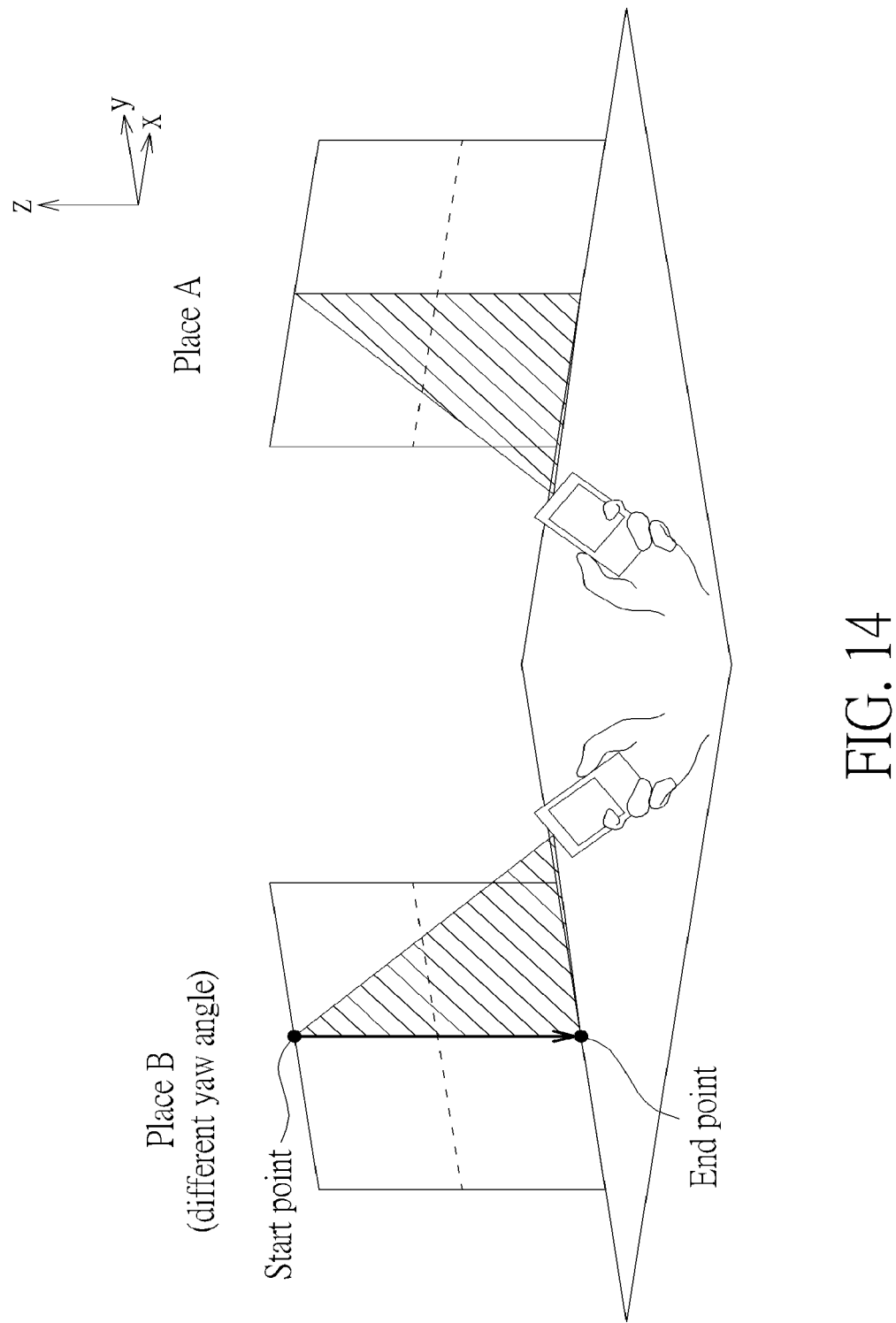
FIG. 14 illustrates the same motion as that shown in FIG. 13 in different situations.

FIG. 13 illustrates a certain motion generated referring to the global coordinate system according to another embodiment of the present invention. As shown in FIG. 13, the motion under consideration is a "DOWN" motion, and according to the motion recognition based on the global coordinate system, the processor detects a trajectory projected on a predetermined plane in the global coordinate system (e.g. a first plane parallel to the x-z plane comprising the x-axis and the z-axis of the x-y-z coordinate system) and also detects the start point and the end point of the trajectory. Please refer to FIG. 14, which illustrates the same motion as that shown in FIG. 13 in different situations. The user may take (and move) the electronic device through the same motion at different places A and B, facing toward different directions. For example, the user may take (and move) the electronic device through the same motion as that shown in FIG. 13, except that the user is facing toward another plane (e.g. a second plane parallel to the y-z plane comprising the y-axis and the z-axis of the x-y-z coordinate system), rather than the plane shown in FIG. 13 (e.g. the first plane parallel to the x-z plane). Please note that, in response to the same motion generated at different places A and B (e.g. at different directions of different yaw angles), the pitch angle changes of the same motion are the same referring to the global coordinate system. For example, in the situation corresponding to the place A, the change of the yaw angle causes the trajectory on the first plane parallel to the x-z plane to start from the "+z"-direction and to end at the "−z"-direction. In another example, in the situation corresponding to the place B, the change of the yaw angle causes the trajectory on the second plane parallel to the y-z plane to start from the "+z"-direction and to end at the "−z"-direction.

According to a variation of this embodiment, when the motion causing the same pitch angle change is replaced by a rolling motion, in response to the same rolling motion generated at different places A and B (e.g. at different directions of different yaw angles), the roll angle changes of the same motion are the same referring to the global coordinate system.

Figure 15:
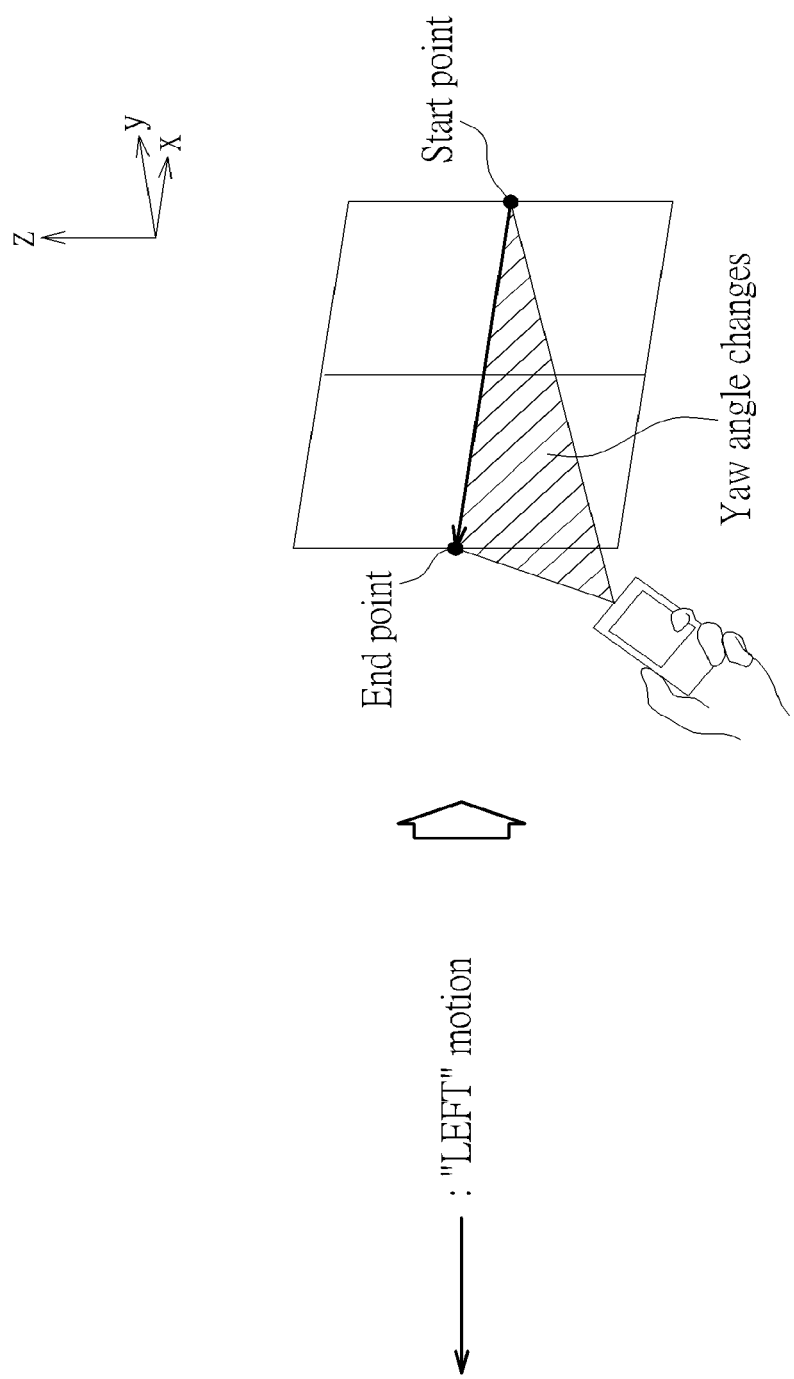
FIG. 15 illustrates a certain motion generated referring to the global coordinate system according to another embodiment of the present invention.
Figure 16:
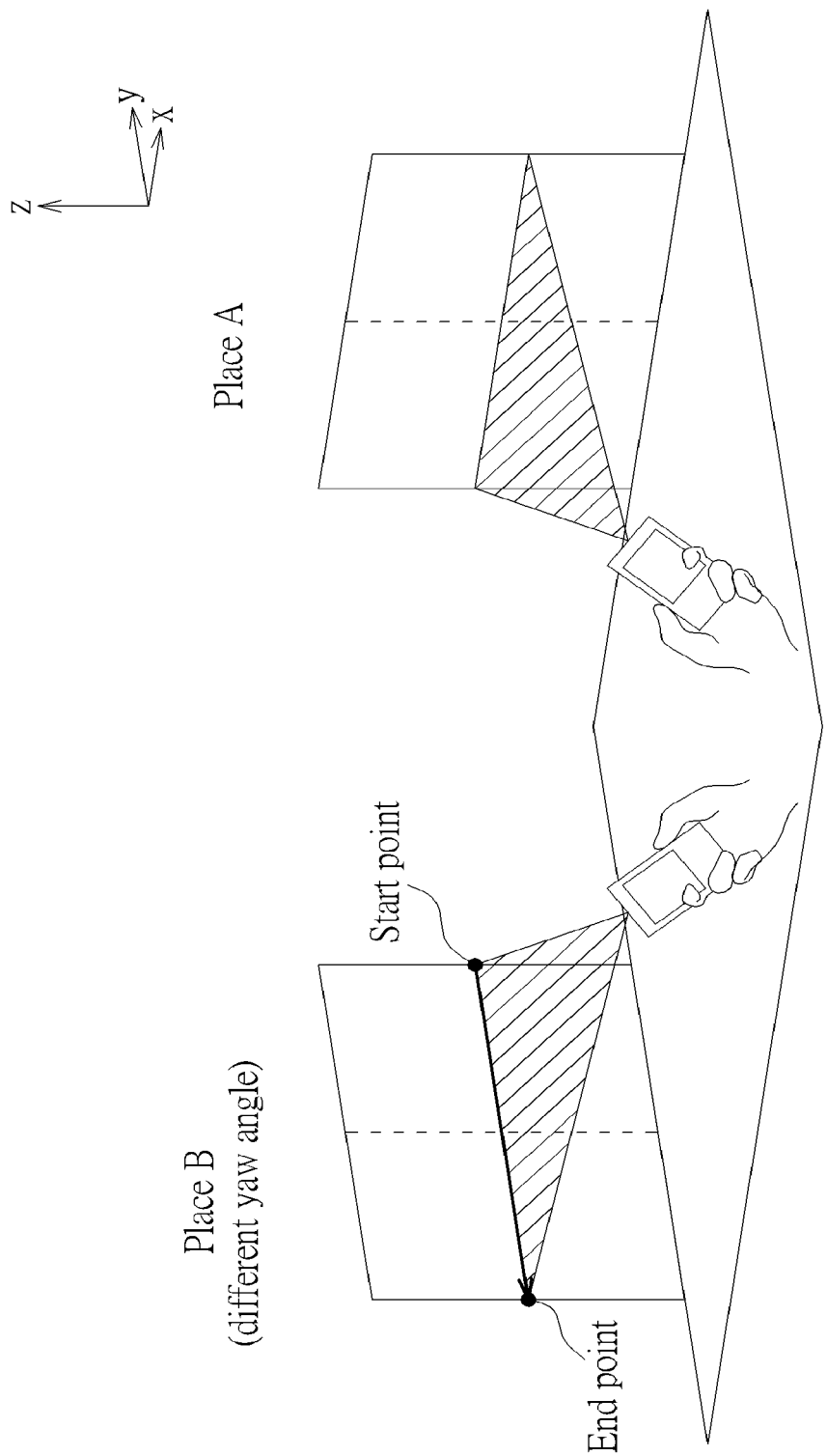
FIG. 16 illustrates the same motion as that shown in FIG. 15 in different situations.

FIG. 15 illustrates a certain motion generated referring to the global coordinate system according to another embodiment of the present invention. As shown in FIG. 15, the motion under consideration is a "LEFT" motion, and according to the motion recognition based on the global coordinate system, the processor detects a trajectory projected on a predetermined plane in the global coordinate system (e.g. the aforementioned first plane parallel to the x-z plane) and also detects the start point and the end point of the trajectory of this embodiment. Please refer to FIG. 16, which illustrates the same motion as that shown in FIG. 15 in different situations. The user may take (and move) the electronic device through the same motion at different places A and B, facing toward different directions. For example, the user may take (and move) the electronic device through the same motion as that shown in FIG. 15, except that the user is facing toward another plane (e.g. the aforementioned second plane parallel to the y-z plane), rather than the plane shown in FIG. 15 (e.g. the aforementioned first plane parallel to the x-z plane). Please note that, in response to the same motion generated at different places A and B (e.g. at different directions of different yaw angles), the yaw angle changes of the same motion are not the same referring to the global coordinate system. For example, in the situation corresponding to the place A, the change of the yaw angle causes the trajectory on the first plane parallel to the x-z plane to start from the "+x"-direction and to end at the "−x"-direction. In another example, in the situation corresponding to the place B, the change of the yaw angle causes the trajectory on the second plane parallel to the y-z plane to start from the "+y"-direction and to end at the "−y"-direction.

Figure 17:
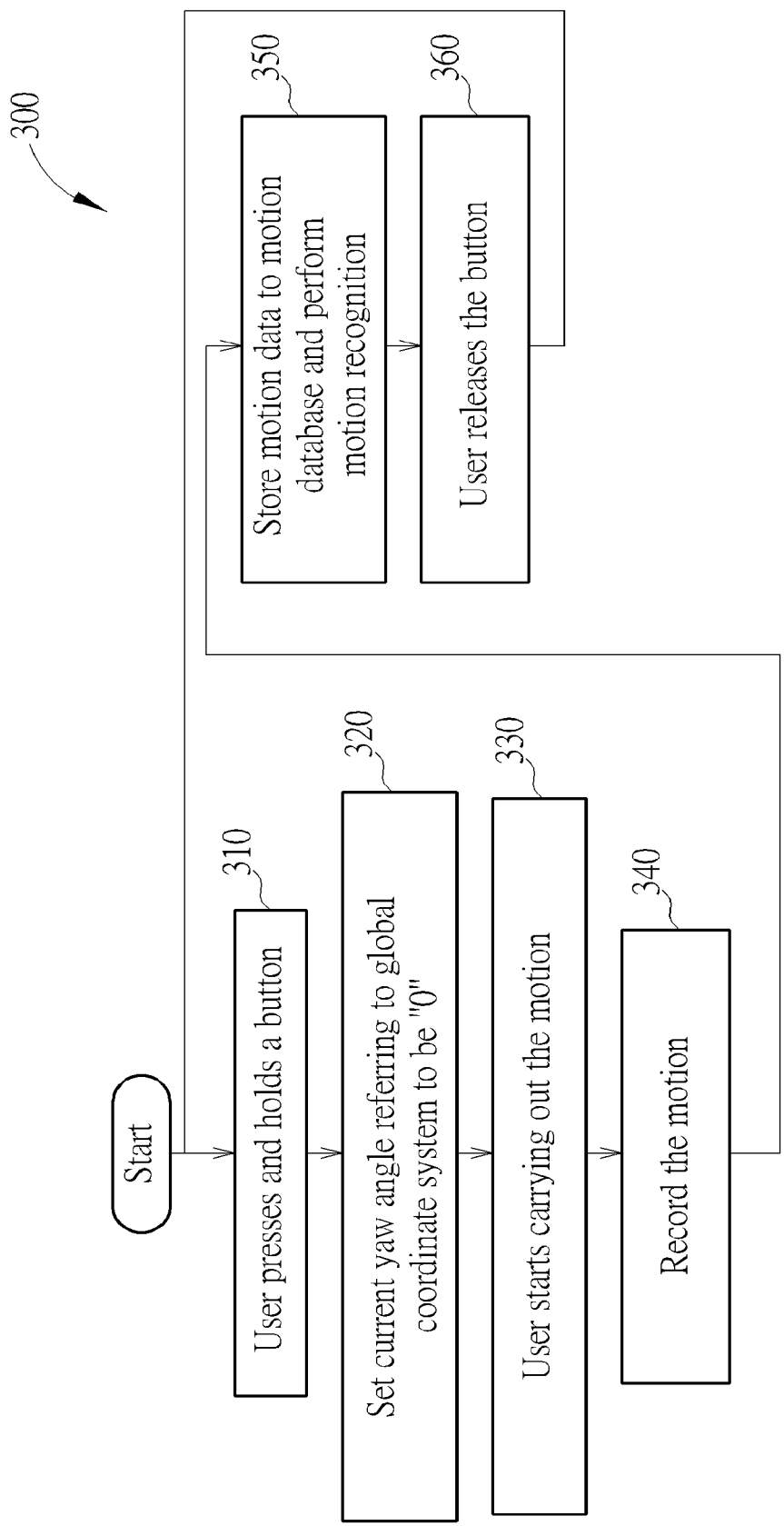
FIG. 17 is a working flow involved with the method mentioned in the embodiment shown in FIG. 4 according to an embodiment of the present invention.

FIG. 17 is a working flow 300 involved with the method mentioned in the embodiment shown in FIG. 4 according to an embodiment of the present invention, where the working flow 300 is utilized for performing calibration of the yaw angle by resetting the yaw to be the aforementioned predetermined value, such as zero or another fixed value.

In Step 310, the processor detects that the user presses and holds a button, and therefore the processor prepares for recording the motion and performing motion recognition, where pressing and holding this button is utilized as a command to start recording the motion to perform motion recognition.

In Step 320, the processor sets the current yaw angle referring to the global coordinate system to be zero. As a result, the problem that the yaw angle changes of the same motion are not the same in different situations (with respect to different initial values of the yaw angle in these situations) can be prevented.

In Step 330, the processor allows the user to start carrying out the motion.

In Step 340, the processor records the motion.

In Step 350, the processor stores the motion data to a motion database, which can be taken as an example of the database, and performs motion recognition.

In Step 360, the processor detects that the user releases the button mentioned in Step 310, and therefore stops recording the motion to be recognized, where releasing this button is utilized as a command to stop recording the motion to be recognized.

Figure 18:
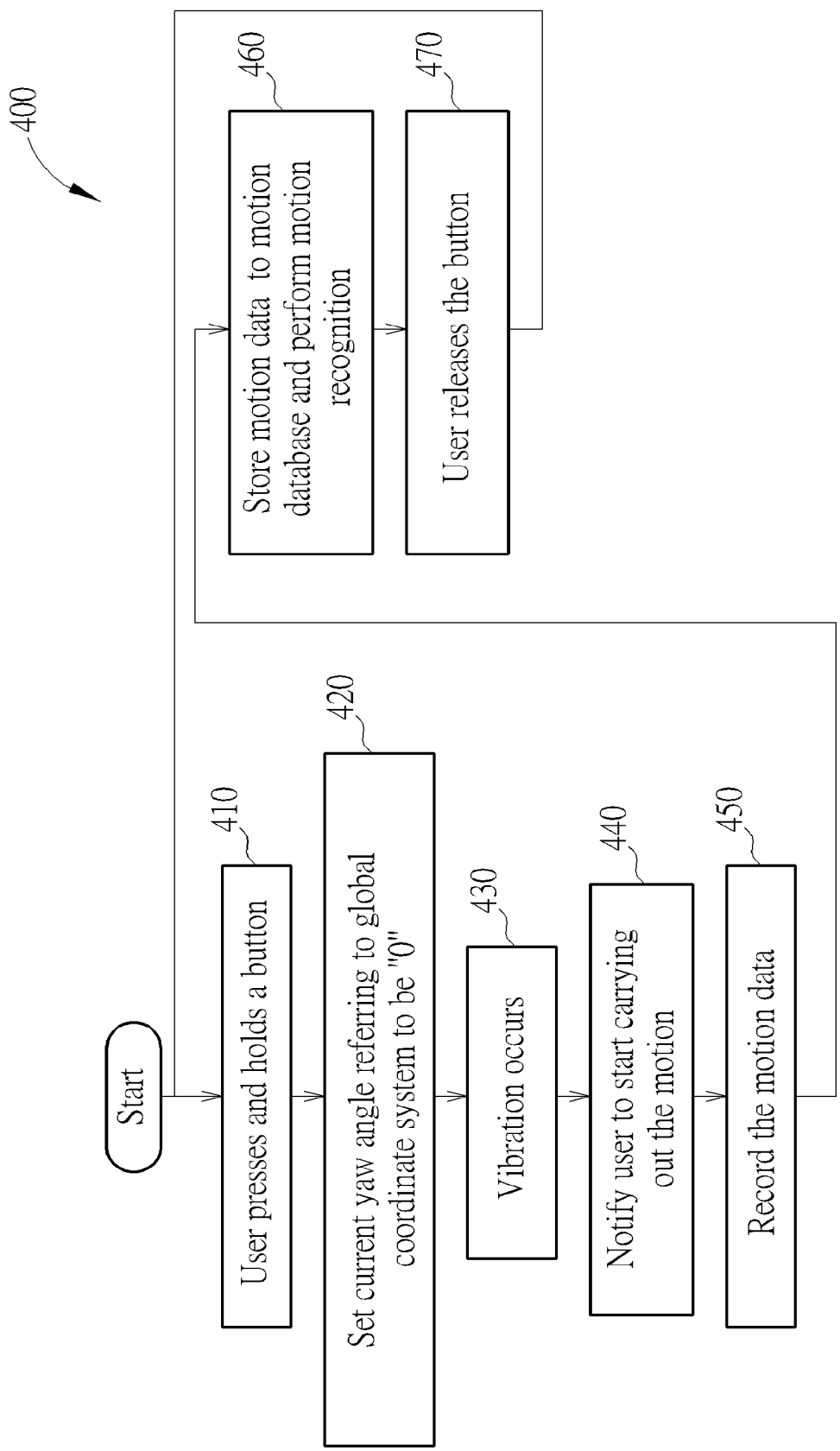
FIG. 18 is a working flow involved with the method mentioned in the embodiment shown in FIG. 4 according to another embodiment of the present invention.

FIG. 18 is a working flow 400 involved with the method mentioned in the embodiment shown in FIG. 4 according to another embodiment of the present invention.

In Step 410, the processor detects that the user presses and holds a button such as that mentioned in Step 310, and therefore the processor prepares for recording the motion and performing motion recognition, where pressing and holding this button is utilized as a command to start recording the motion to perform motion recognition.

In Step 420, the processor sets the current yaw angle referring to the global coordinate system to be zero. As a result, the problem that the yaw angle changes of the same motion are not the same in different situations (with respect to different initial values of the yaw angle in these situations) can be prevented.

In Step 430, under control of the processor, vibration occurs (e.g. the processor controls a vibrator of the electronic device to vibrate, while waiting for a predetermined time), where the vibration can be utilized for notifying the user that the user can start carrying out the motion.

In Step 440, the processor notifies the user that the user can start carrying out the motion. For example, under control of the processor, the display module 170 may display a message for notifying that the user can start carrying out the motion.

In Step 450, the processor records the motion data.

In Step 460, the processor stores the motion data to a motion database such as that mentioned in Step 350 and performs motion recognition.

In Step 470, the processor detects that the user releases the button mentioned in Step 410, and therefore stops recording the motion to be recognized, where releasing this button is utilized as a command to stop recording the motion to be recognized.

Motion Recognition Design Flow

Figure 19:
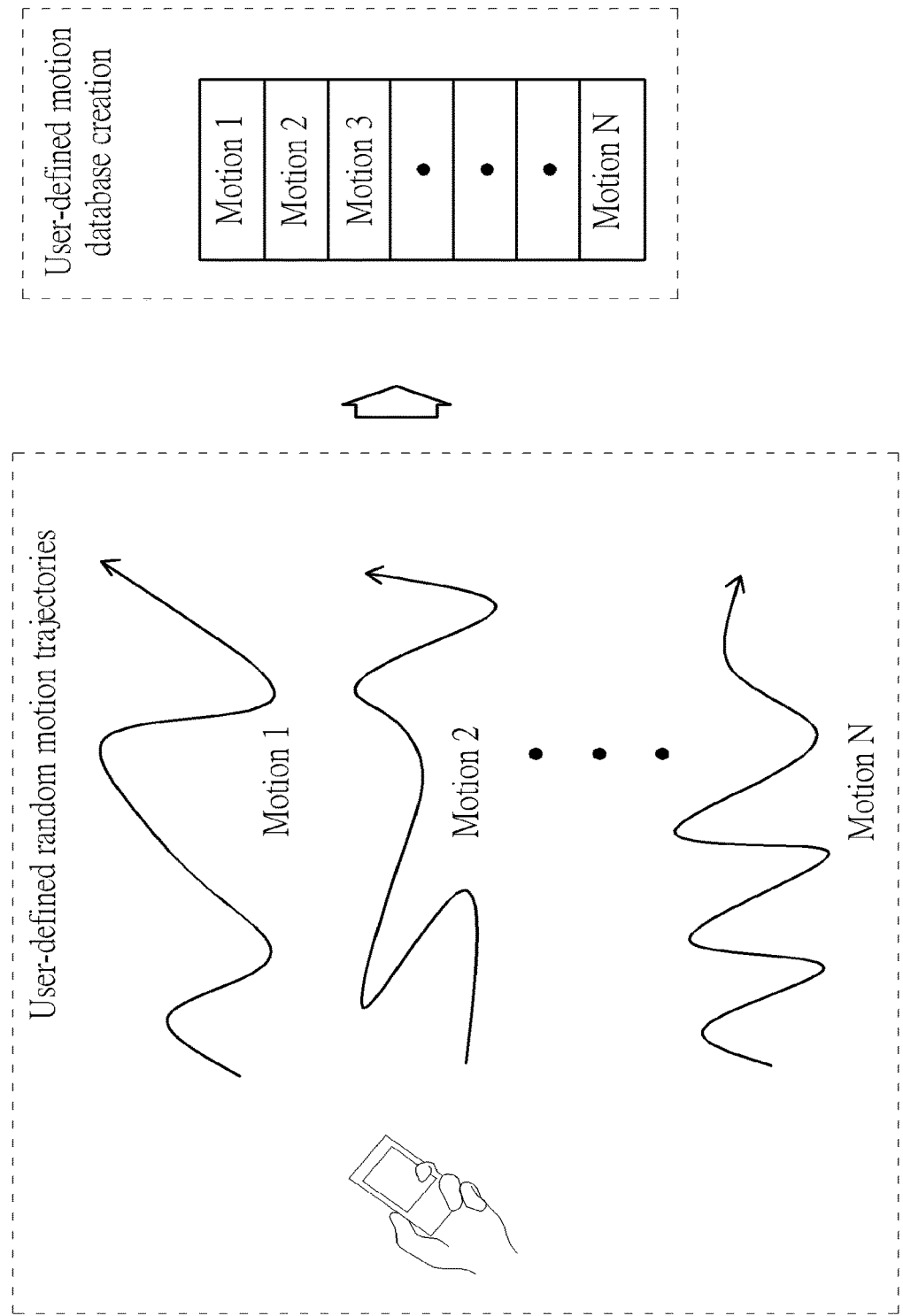
FIG. 19 illustrates some relationships between a plurality of motions and the associated motion data in a user-defined motion recognition database according to an embodiment of the present invention.

FIG. 19 illustrates some relationships between a plurality of motions and the associated motion data in a user-defined motion recognition database (e.g. the user-defined gesture database mentioned above) according to an embodiment of the present invention. As shown in FIG. 19, the user may carry out various kinds of motions having different trajectories (e.g. those labeled "Motion 1", "Motion 2", . . . , and "Motion N" in the left half of FIG. 19), respectively. Under control of the processor, the user-defined motion recognition database is arranged to store the motion data of these motions, respectively. For example, each of these motion trajectories may contain both translation information and rotational information, such as the linear acceleration and the orientation-angles (e.g. the roll, the yaw, and the pitch angles of the orientation of the electronic device). As a result, the user can define these motions in the user-defined motion recognition database, respectively.

For better comprehension, the motion data respectively corresponding to the motions "Motion 1", "Motion 2", . . . , and "Motion N" illustrated in the left half of FIG. 19 are labeled "Motion 1", "Motion 2", . . . , and "Motion N" within the data structure of the user-defined motion database illustrated in the right half of FIG. 19. In practice, in a situation where the motions "Motion 1", "Motion 2", . . . , and "Motion N" illustrated in the left half of FIG. 19 are some user-defined gestures, the motion data respectively corresponding to the motions "Motion 1", "Motion 2", . . . , and "Motion N" within the data structure of the user-defined motion database illustrated in the right half of FIG. 19 can be regarded as the gesture data corresponding to these user-defined gestures, and therefore can be re-labeled "Gesture 1", "Gesture 2", . . . , and "Gesture N", respectively.

Figure 20:
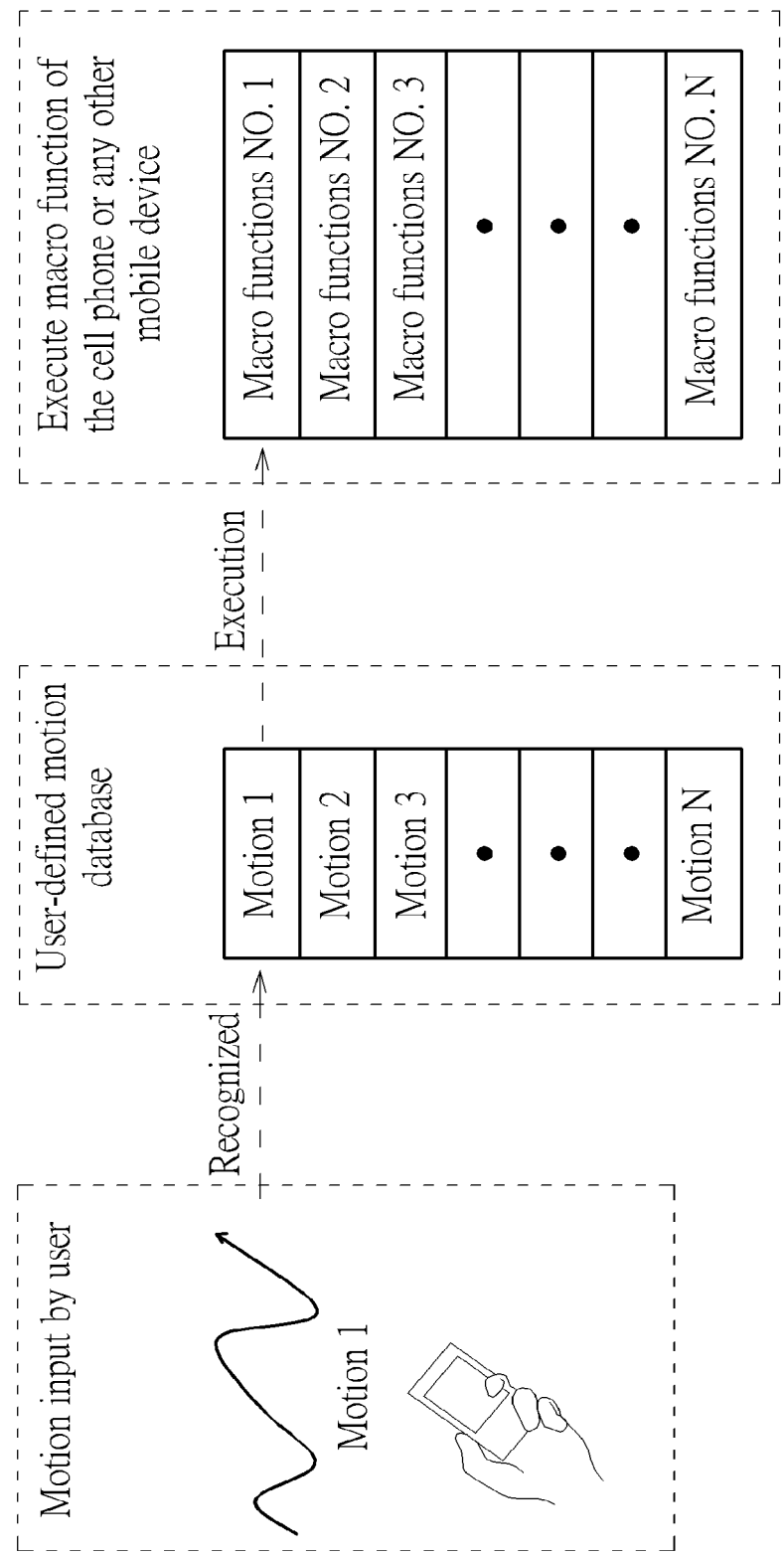
FIG. 20 illustrates some relationships between the associated motion data respectively corresponding to the plurality of motions mentioned in the embodiment shown in FIG. 19 and the associated sets of macro functions within at least one database of the apparatus shown in FIG. 4.

FIG. 20 illustrates some relationships between the associated motion data respectively corresponding to the plurality of motions mentioned in the embodiment shown in FIG. 19 and the associated sets of macro functions (e.g. those labeled "Macro functions NO. 1", "Macro functions NO. 2", "Macro functions NO. 3", . . . , and "Macro functions NO. N") within the database, where the processor allows the user to define these relationships in advance and update (e.g. edit) these relationships. As shown in FIG. 20, when a motion such as that shown in the leftmost of FIG. 20 is recognized as a specific motion within the plurality of motions (e.g. "Motion 1"), the processor triggers the associated set of macro functions (e.g. "Macro functions NO. 1").

Figure 21:
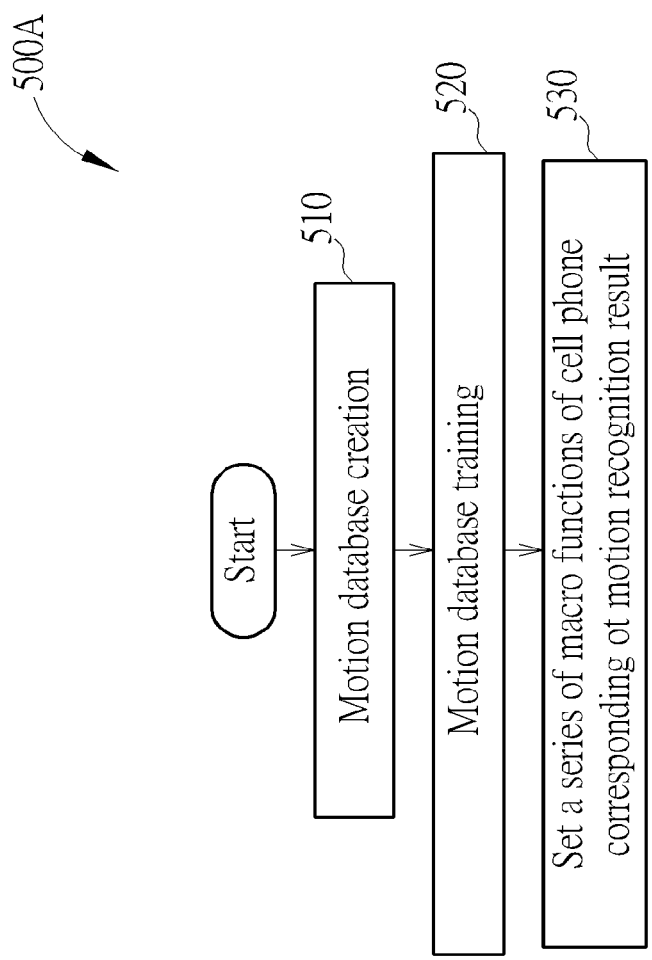
FIG. 21 is a working flow involved with the method mentioned in the embodiment shown in FIG. 4 according to another embodiment of the present invention.

FIG. 21 is a working flow 500A involved with the method mentioned in the embodiment shown in FIG. 4 according to another embodiment of the present invention, where the working flow 500A can be utilized for creation of motion-based macro function of the electronic device (e.g. a cell phone).

In Step 510, the processor performs motion database creation, in order to create the user-defined motion recognition database mentioned in the embodiment shown in FIG. 19.

In Step 520, the processor performs motion database training such as that performed in the embodiment shown in FIG. 19. For example, the motion database training may represent a weighting parameter adjustment process, for learning the motions.

In Step 530, the processor sets a series of macro functions of the electronic device, the macro functions corresponding to motion recognition results, respectively. As a result, the weighting parameters obtained from the weighting parameter adjustment process can be used for determining the recognition result based on the motion input.

Figure 22:
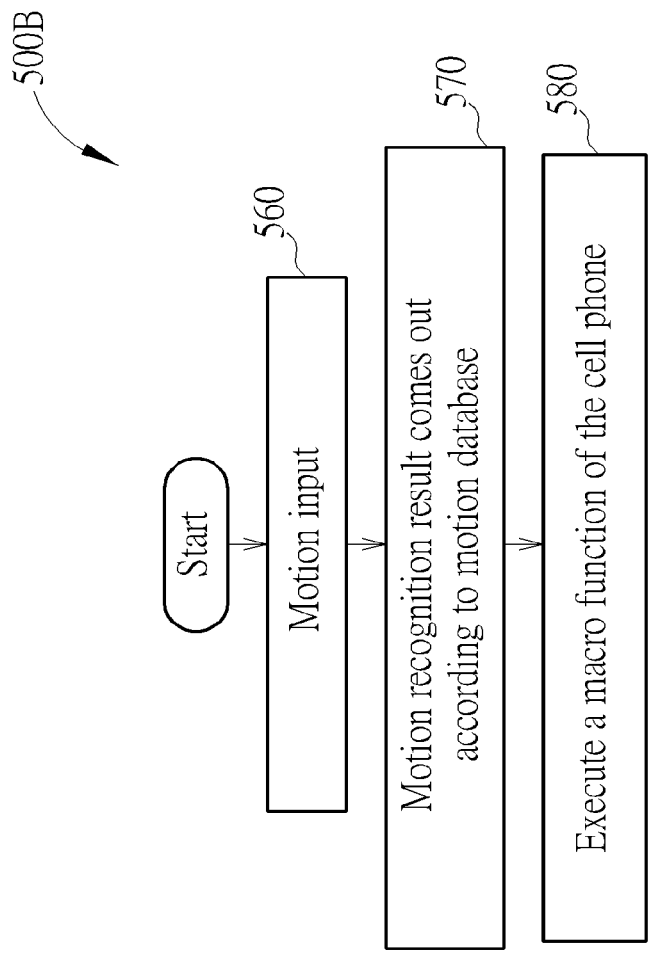
FIG. 22 is a working flow involved with the method mentioned in the embodiment shown in FIG. 4 according to another embodiment of the present invention.

FIG. 22 is a working flow 500B involved with the method mentioned in the embodiment shown in FIG. 4 according to another embodiment of the present invention, where the working flow 500A can be utilized for execution of motion-based macro function of the electronic device (e.g. the cell phone mentioned above).

In Step 560, the processor detects the motion input.

In Step 570, under control of the processor, the motion recognition result comes out according to the motion database such as the user-defined motion recognition database mentioned in the embodiment shown in FIG. 19.

In Step 580, the processor executes at least one macro function (more particularly, a set of macro functions) of the electronic device such as the cell phone.

Figure 23:
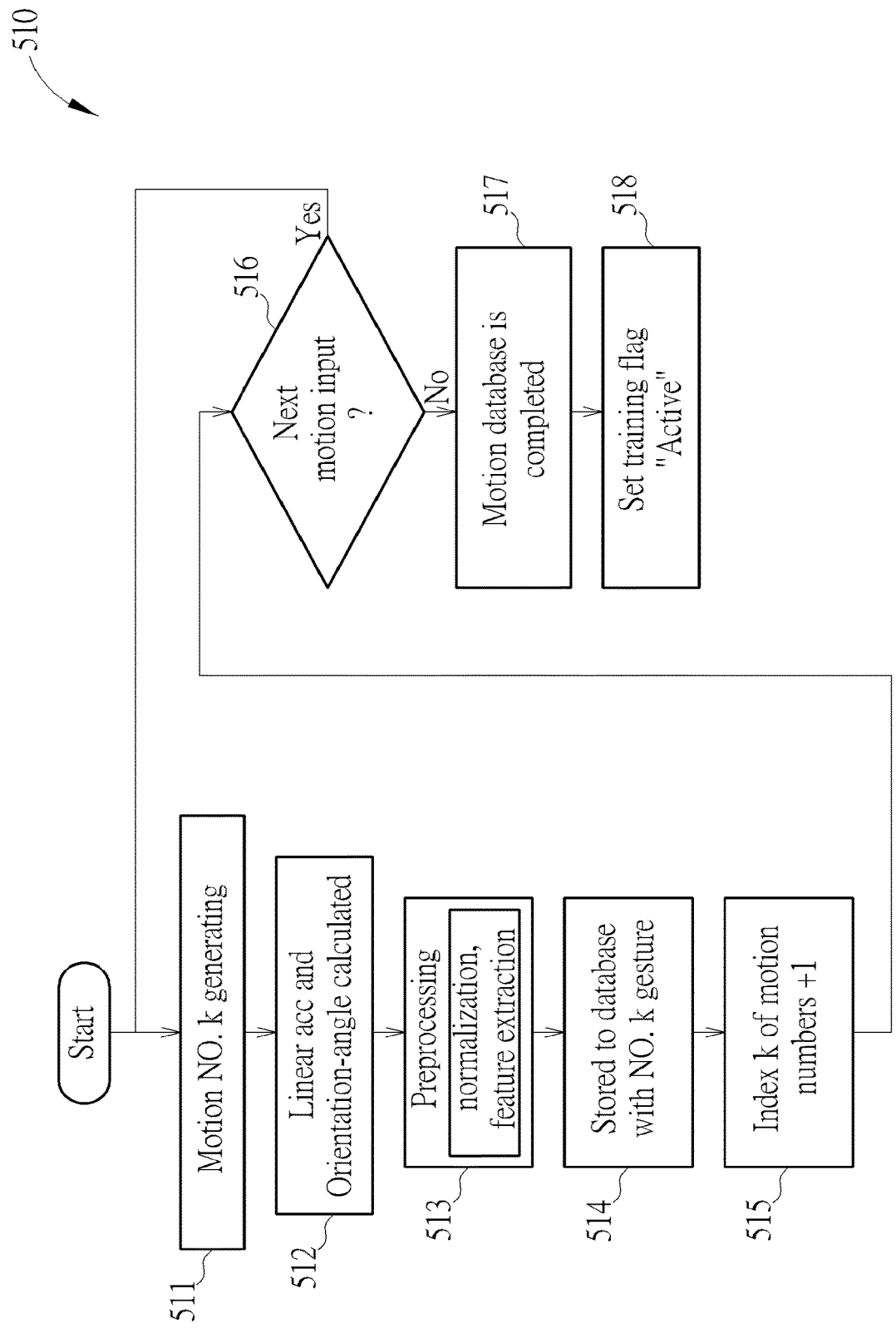
FIG. 23 illustrates some implementation details of a step shown in FIG. 21 according to an embodiment of the present invention.

FIG. 23 illustrates some implementation details of Step 510 shown in FIG. 21 according to an embodiment of the present invention.

In Step 511, the processor detects Motion NO. k (more particularly, the sensor data thereof) generating, where the aforementioned "Motion NO. k" may represent one of the plurality of motions mentioned in the embodiment shown in FIG. 19, such as the motions labeled "Motion 1", "Motion 2", . . . , and "Motion N" in the left half of FIG. 19.

In Step 512, the processor calculates the associated linear acceleration and the associated orientation-angle(s).

In Step 513, the processor performs preprocessing, such as normalization and feature extraction.

In Step 514, the processor stores the preprocessing result to the database (e.g. the user-defined motion recognition database mentioned in the embodiment shown in FIG. 19), for example, with NO. k gesture (or "Gesture k", the k.sup.th gesture in the user-defined gesture database) being associated to the aforementioned Motion NO. k of Step 511.

In Step 515, the processor controls the index k of motion numbers to be increased with an increment such as one.

In Step 516, the processor checks whether the next motion input exists.

In Step 517, under control of the processor, the motion database such as the user-defined motion recognition database mentioned in the embodiment shown in FIG. 19 is completed.

In Step 518, the processor sets the training flag FLAG_train as "Active" (e.g. a state indicating that training is active, or a state indicating that training is required), allowing the motion database to be trained.

Figure 24:
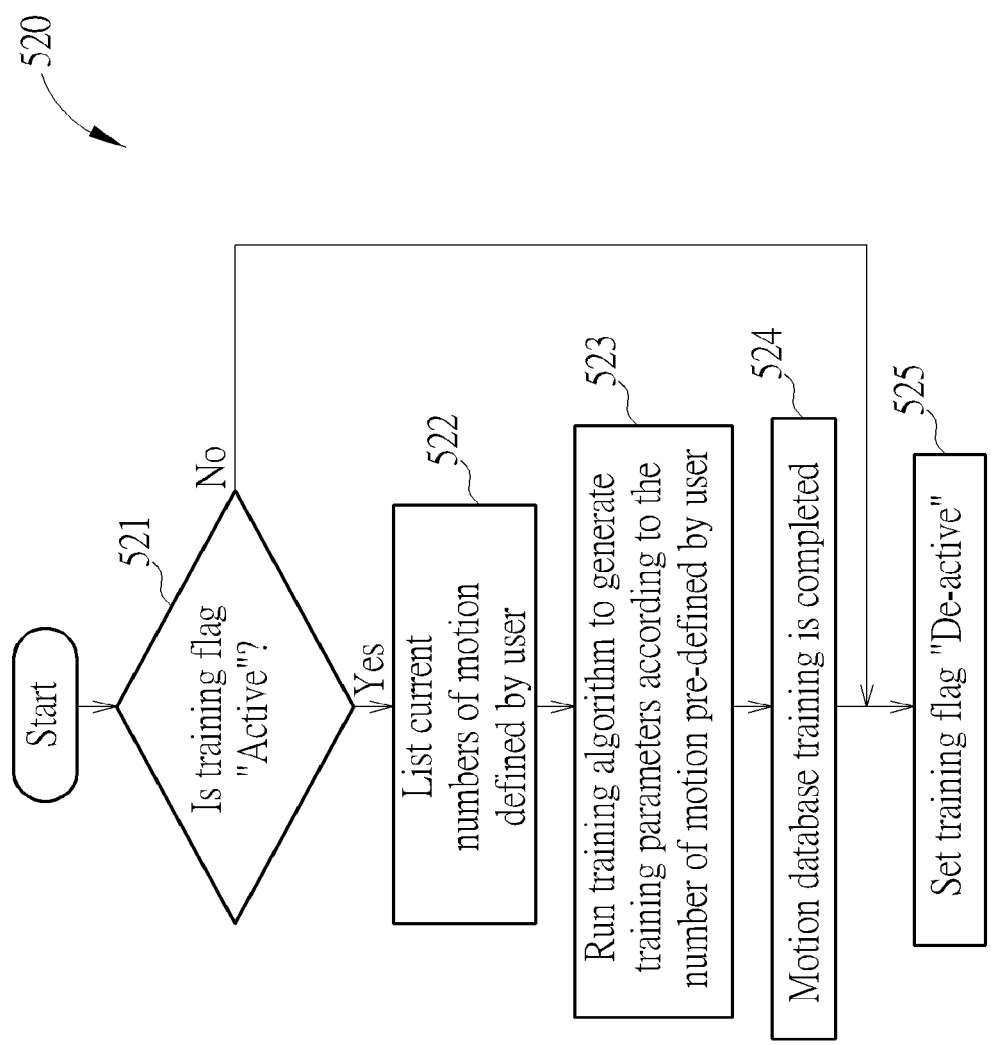
FIG. 24 illustrates some implementation details of another step shown in FIG. 21 according to the embodiment shown in FIG. 23.

FIG. 24 illustrates some implementation details of Step 520 shown in FIG. 21 according to the embodiment shown in FIG. 23.

In Step 521, the processor checks whether the training flag FLAG_train is set as "Active".

In Step 522, the processor lists the current numbers of motion defined by the user.

In Step 523, the processor runs the training algorithm to generate the training parameters (e.g. the weighting parameters mentioned above) according to the number of motion pre-defined by the user.

In Step 524, under control of the processor, the motion database training is completed.

In Step 525, the processor sets the training flag FLAG_train as "De-active", which is typically the inverted state of "Active" mentioned in Step 518.

Figure 25:
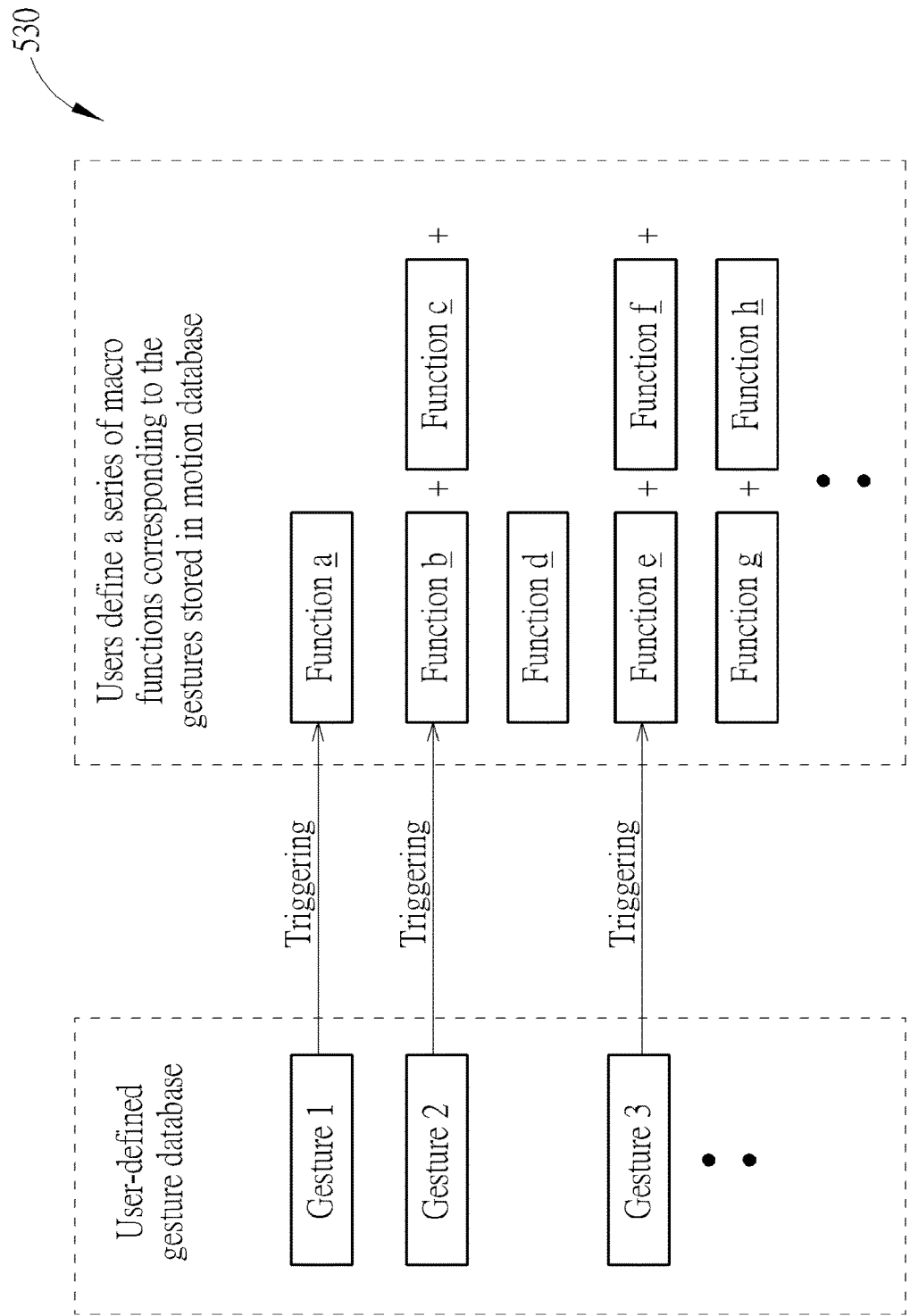
FIG. 25 illustrates some implementation details of another step shown in FIG. 21 according to the embodiment shown in FIG. 23.

FIG. 25 illustrates some implementation details of Step 530 shown in FIG. 21 according to the embodiment shown in FIG. 23. As shown in FIG. 25, the processor sets a series of macro functions of the electronic device (e.g. the cell phone), the macro functions corresponding to motion recognition results, respectively, where the motion recognition results represent the recognized gestures, i.e. the recognized motion, which are carried out by the user. As a result, the recognized gestures (e.g. those labeled "Gesture 1", "Gesture 2", "Gesture 3", . . . in the left half of FIG. 25) can be utilized for triggering the associated sets of macro functions, respectively. For example, "Gesture 1" can be utilized for triggering a set of macro functions, such as the macro function {Function a}. In another example, "Gesture 2" can be utilized for triggering another set of macro functions, such as the macro functions {Function b, Function c, Function d}, which are performed in the order shown in FIG. 25. In another example, "Gesture 3" can be utilized for triggering another set of macro functions, such as the macro functions {Function e, Function f, Function g, Function h}, which are performed in the order shown in FIG. 25.

Figure 26:
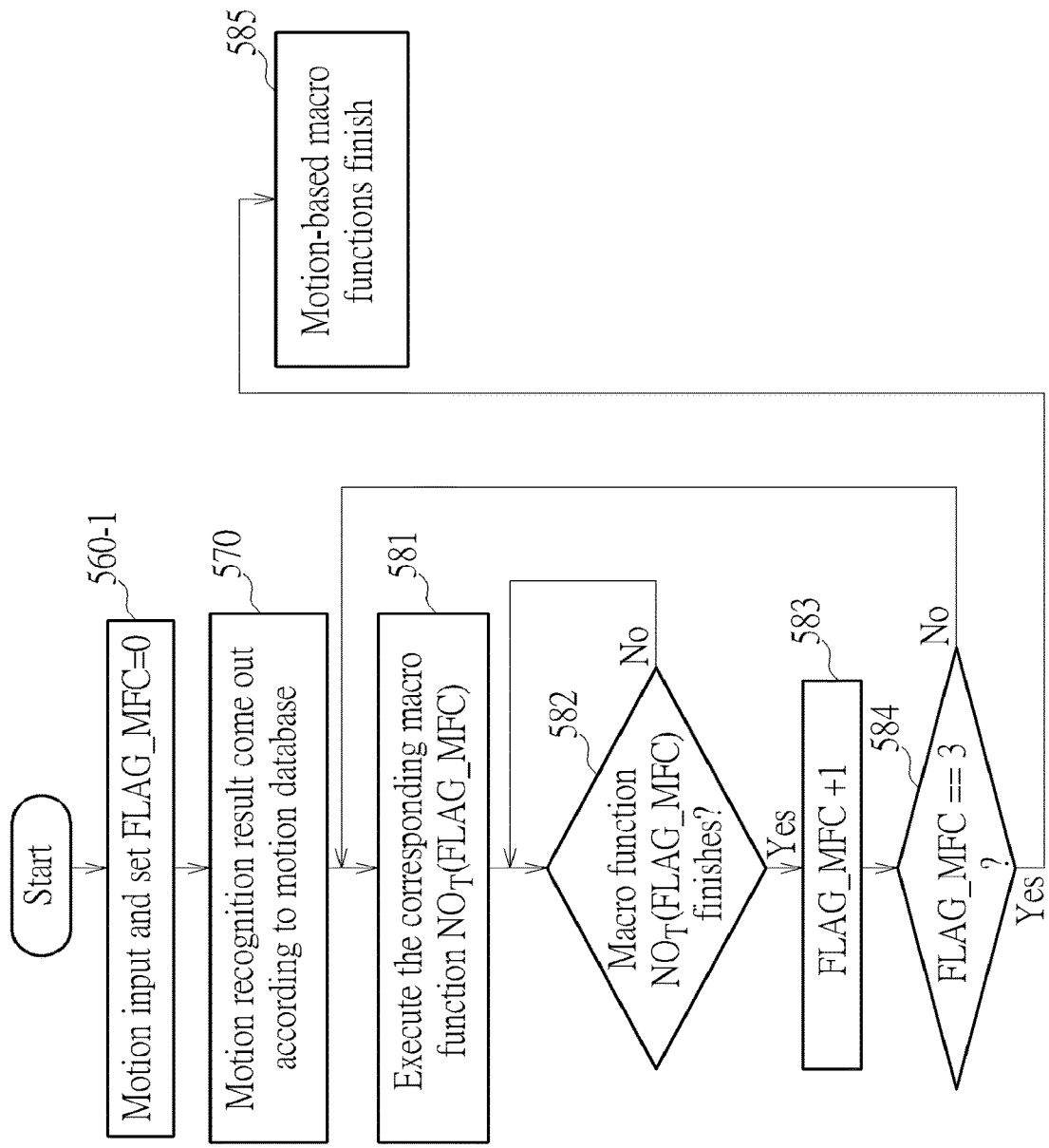
FIG. 26 illustrates some implementation details involved with the working flow shown in FIG. 22 according to another embodiment of the present invention.

FIG. 26 illustrates some implementation details involved with the working flow shown in FIG. 22 according to another embodiment of the present invention. Please note that the number of macro functions of the user-defined macro function corresponding to the at least one motion recognition result, can be regarded as a macro function count MFC. Typically, the macro function count MFC is a positive integer. For example, the macro function count MFC can be equal to three for the recognized motion (e.g. a specific gesture such as that labeled "Gesture 2" in the left half of FIG. 25) in this embodiment. This is for illustrative purposes only, and is not meant to be a limitation of the present invention. According to a variation of this embodiment, the macro function count MFC can be equal to one for the recognized motion (e.g. a specific gesture such as that labeled "Gesture 1" in the left half of FIG. 25). According to another variation of this embodiment, the macro function count MFC can be equal to four for the recognized motion (e.g. a specific gesture such as that labeled "Gesture 4" in the left half of FIG. 25).

In Step 560-1, the processor detects the motion input and set an index FLAG_MFC to be an initial value such as zero, in order to start counting the executed macro functions in the working flow shown in FIG. 26.

In Step 570, under control of the processor, the motion recognition result comes out according to the motion database such as the user-defined motion recognition database mentioned in the embodiment shown in FIG. 19.

In Step 581, the processor executes the corresponding macro function NO.sub.T(FLAG_MFC), where the function NO.sub.T(FLAG_MFC) represents a mapping relationship between the macro function to be executed in the outer loop comprising Step 581 (i.e. the loop formed with Step 581 through to Step 584) and the index FLAG_MFC, and can be implemented by at least one table. In practice, the processor may store the definition of the associated sets of macro functions mentioned in the embodiment shown in FIG. 20 (more particularly, the definition of the sets of macro functions shown in the right half of FIG. 25) into the table in advance.

For example, in a situation where the recognized motion is the gesture labeled "Gesture 2" in the left half of FIG. 25, the macro functions NO.sub.T(0), NO.sub.T(1), and NO.sub.T(2) represent the macro functions "Function b", "Function c", and "Function d", respectively. That is, in Step 581, the processor may execute the macro function "Function b" when FLAG_MFC=0, or execute the macro function "Function c" when FLAG_MFC=1, or execute the macro function "Function d" when FLAG_MFC=2.

In Step 582, the processor checks whether the operation of the macro function NO.sub.T(FLAG_MFC) finishes.

In Step 583, the processor increases the index FLAG_MFC with an increment such as one.

In Step 584, the processor checks whether the index FLAG_MFC reaches the macro function count MFC.

In Step 585, under control of the processor, the operations of the motion-based macro functions are finished.

Figure 27:
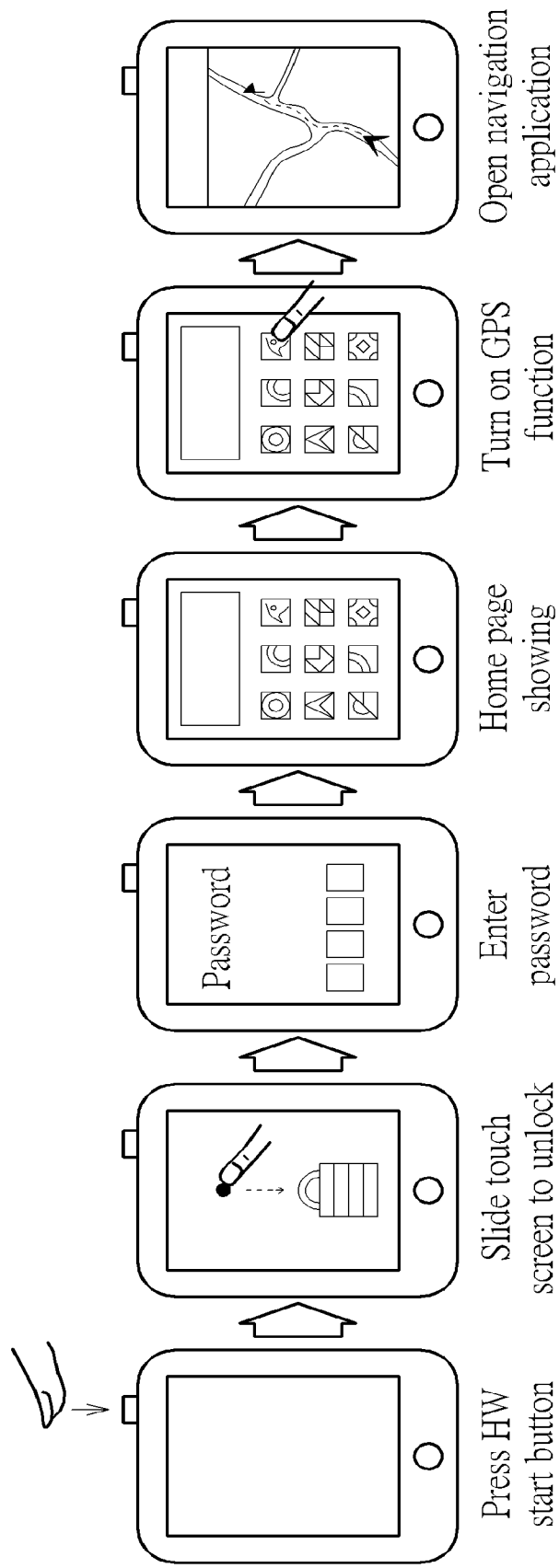
FIG. 27 illustrates a plurality of finger-touched steps for enabling a specific application according an embodiment of the present invention.

FIG. 27 illustrates a plurality of finger-touched steps for enabling a specific application (such as a navigation application) according an embodiment of the present invention. As shown in FIG. 27, the processor detects that the user presses the hardware (HW) start button, and further detects that the user slides on the touch screen (or the touch panel mentioned above) to unlock. Then, the processor allows the user to enter the password and then detects that the password is correct. Afterward, the processor triggers the Home page showing on the touch screen, and then detects that the user turns on the GPS function of the GPS module mentioned above. Finally, the user opens the navigation application to use it.

Figure 28:
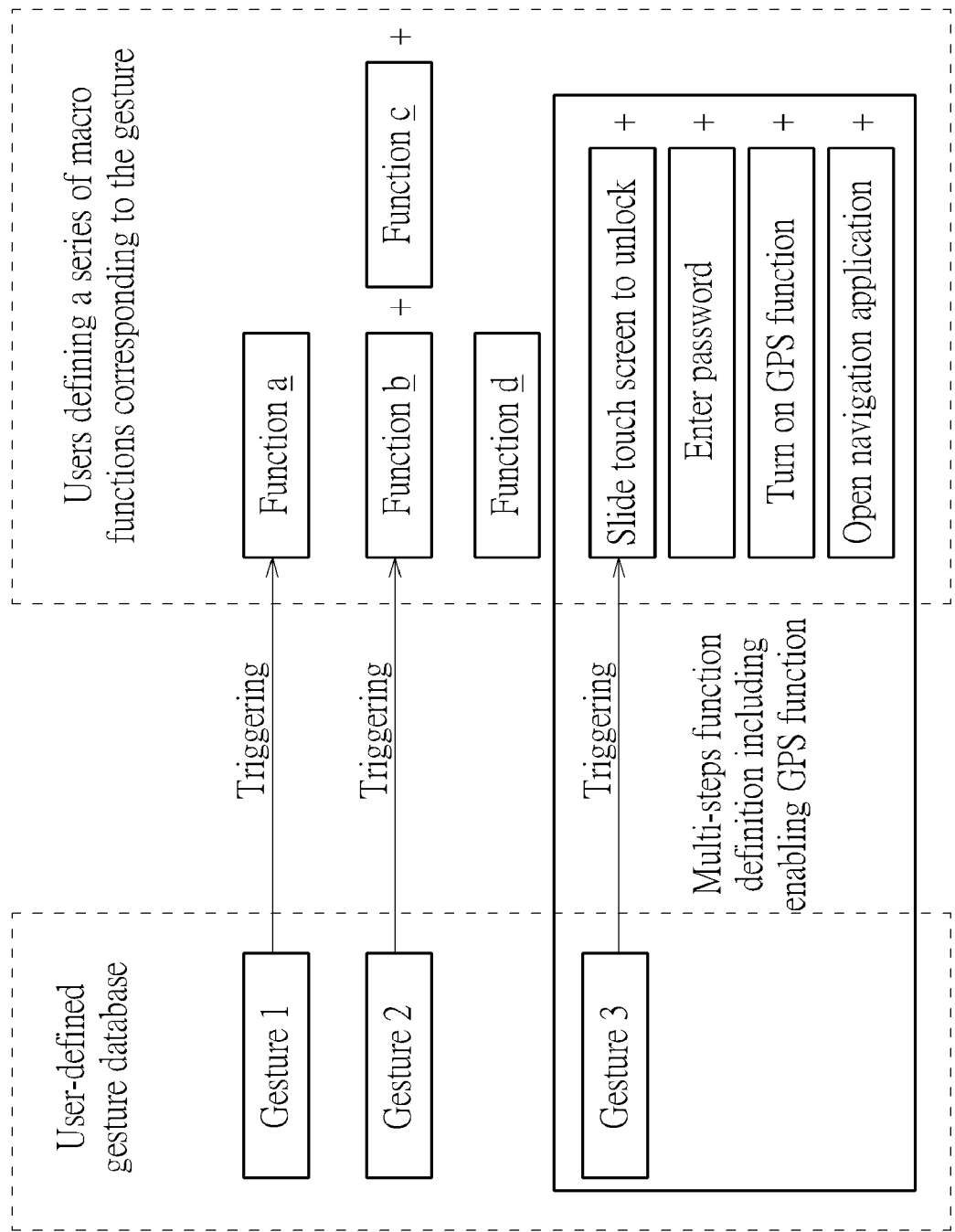
FIG. 28 illustrates some implementation details of multi-steps function definition including enabling a Global Positioning System (GPS) function according to another embodiment of the present invention.

FIG. 28 illustrates some implementation details of multi-steps function definition including enabling the GPS function mentioned above according to another embodiment of the present invention. As shown in FIG. 28, a set of macro functions shown in FIG. 25 (more particularly, the set of macro functions illustrated around the bottom right corner of FIG. 25) is replaced by a set of operations, which may comprise sliding on the touch screen to unlock (virtually or automatically), entering the password (virtually or automatically), turning on the GPS function (automatically), and opening the navigation application (automatically). That is, in response to a specific gesture such as that labeled "Gesture 3", the processor automatically prepares everything required for using the navigation application. As a result, using many finger-touched steps for enabling a specific application (such as a navigation application) is not needed.

Figure 29:
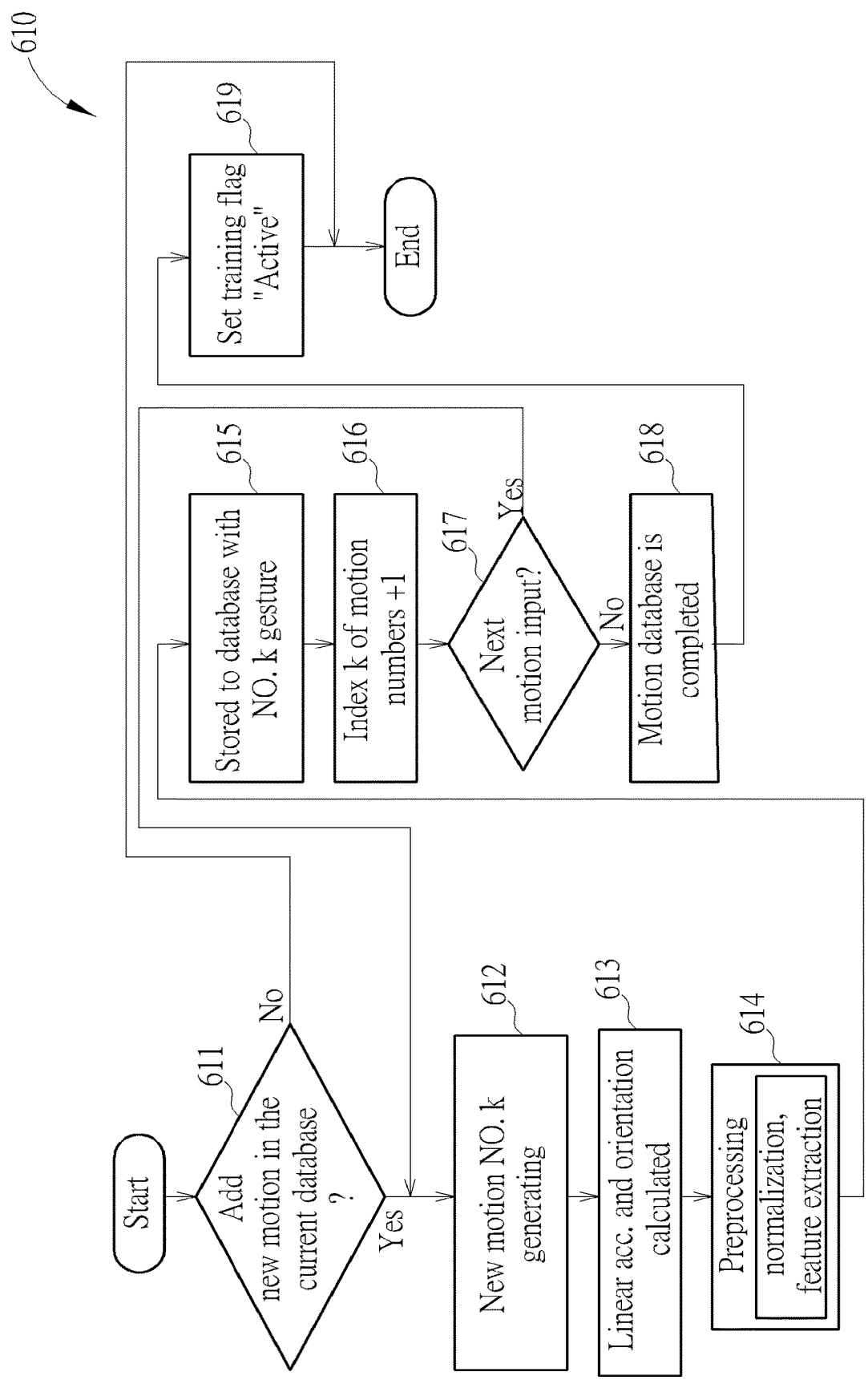
FIG. 29 is a working flow involved with the method mentioned in the embodiment shown in FIG. 4 according to another embodiment of the present invention.

FIG. 29 is a working flow 610 involved with the method mentioned in the embodiment shown in FIG. 4 according to another embodiment of the present invention, where the working flow 610 can be utilized for adding motion(s) in the current motion database such as that obtained from the working flow 500A. Thus, once the user finish the setting of the motion database such as that in the embodiment shown in FIG. 21, they can still add any other motion gestures in the motion database.

In Step 611, the processor checks whether adding new motion in the current database is requested by the user.

In Step 612, the processor detects a new Motion NO. k (more particularly, the sensor data thereof) generating. For example, the processor may control the initial value of the index k of motion numbers in the working flow 610 to be the final value of the index k of motion numbers in the embodiment shown in FIG. 23, as if the working flow shown in FIG. 23 continues with the first new motion in the working flow 610, to update the current motion database. In another example, the processor may control the initial value of the index k of motion numbers in the working flow 610 to be the final value of the index k of motion numbers in the previous execution of the same working flow 610.

In Step 613, the processor calculates the associated linear acceleration and the associated orientation-angle(s).

In Step 614, the processor performs preprocessing, such as normalization and feature extraction.

In Step 615, the processor stores the preprocessing result to the database (e.g. the user-defined motion recognition database mentioned in the embodiment shown in FIG. 19), for example, with NO. k gesture (or "Gesture k", the k.sup.th gesture in the user-defined gesture database) being associated to the aforementioned Motion NO. k of Step 612.

In Step 616, the processor controls the index k of motion numbers to be increased with an increment such as one.

In Step 617, the processor checks whether the next motion input exists.

In Step 618, under control of the processor, the motion database is completed.

In Step 619, the processor sets the training flag FLAG_train as "Active", allowing the motion database to be trained.

Figure 30:
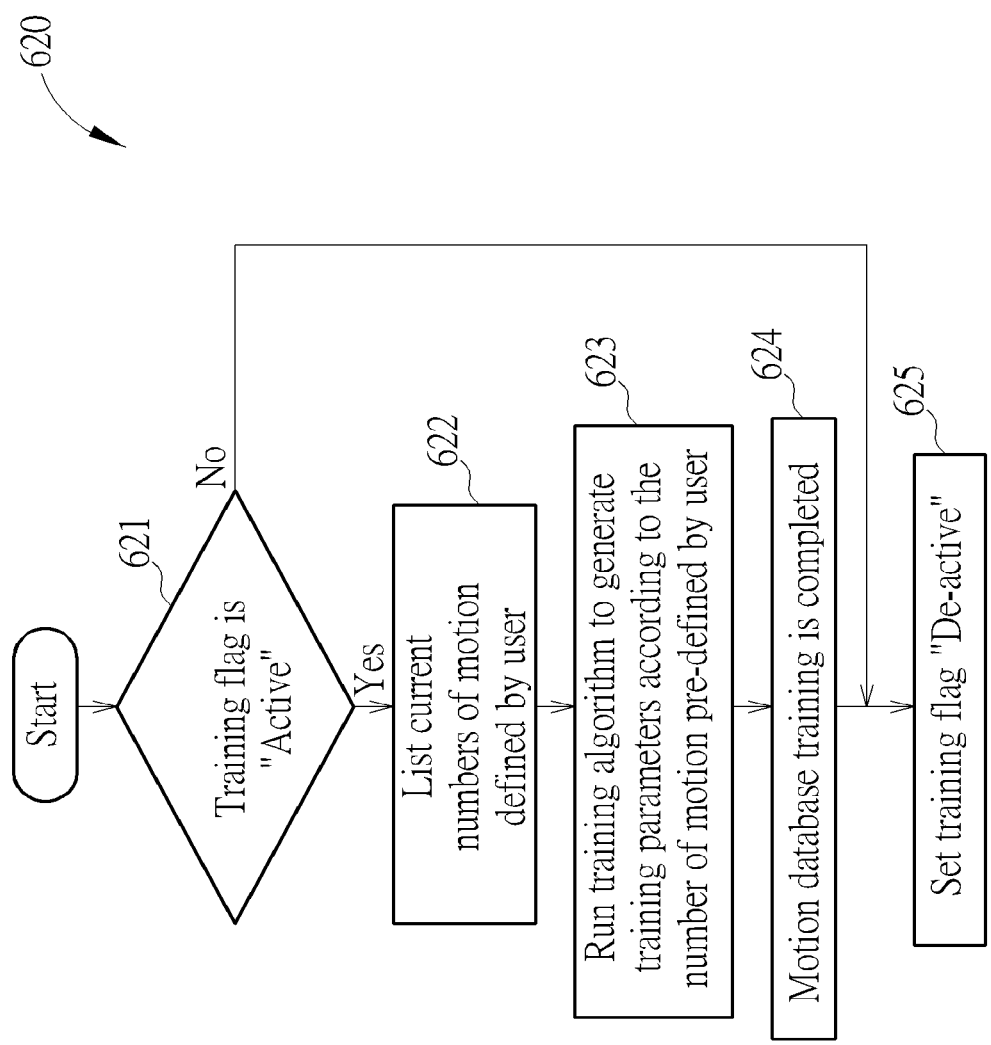
FIG. 30 is a working flow involved with the method mentioned in the embodiment shown in FIG. 4 according to another embodiment of the present invention.

FIG. 30 is a working flow 620 involved with the method mentioned in the embodiment shown in FIG. 4 according to another embodiment of the present invention, where the working flow 620 can be utilized for re-training the updated database of the embodiment shown in FIG. 29 when a new motion is added.

In Step 621, the processor checks whether the training flag FLAG_train is set as "Active".

In Step 622, the processor lists the current numbers of motion defined by the user.

In Step 623, the processor runs the training algorithm to generate the training parameters (e.g. the weighting parameters mentioned above) according to the number of motion pre-defined by the user.

In Step 624, under control of the processor, the motion database training is completed.

In Step 625, the processor sets the training flag FLAG_train as "De-active".

Figure 31:
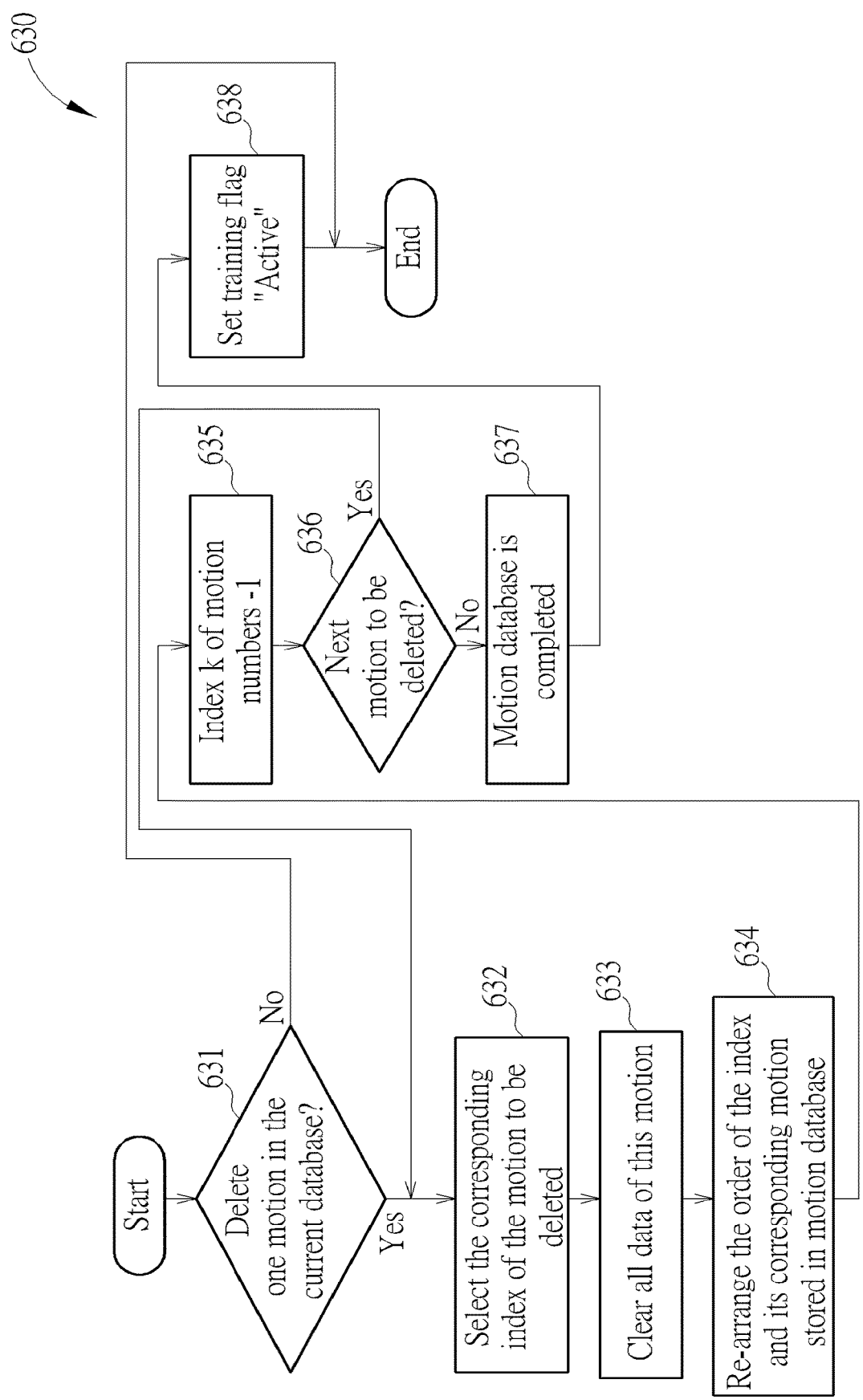
FIG. 31 is a working flow involved with the method mentioned in the embodiment shown in FIG. 4 according to another embodiment of the present invention.

FIG. 31 is a working flow 630 involved with the method mentioned in the embodiment shown in FIG. 4 according to another embodiment of the present invention, where the working flow 630 can be utilized for deleting motion(s) in the current motion database such as that obtained from the working flow 500A.

In Step 631, the processor checks whether deleting one motion in the current database is requested by the user.

In Step 632, the processor detects that the user selects the corresponding index of the motion to be deleted.

In Step 633, the processor clears all data of this motion.

In Step 634, the processor re-arranges the order of the index and its corresponding motion stored in the motion database. As a result, the ranking of at least one portion (e.g. a portion or all) of the remaining data in the motion database may be adjusted, and therefore the remaining data in the motion database can be accessed easily and correctly.

In Step 635, the processor controls the index k of motion numbers to be decreased with a decrement such as one.

In Step 636, the processor checks whether the next motion to be deleted exists.

In Step 637, under control of the processor, the motion database is completed.

In Step 638, the processor sets the training flag FLAG_train as "Active", allowing the motion database to be trained.

Figure 32:
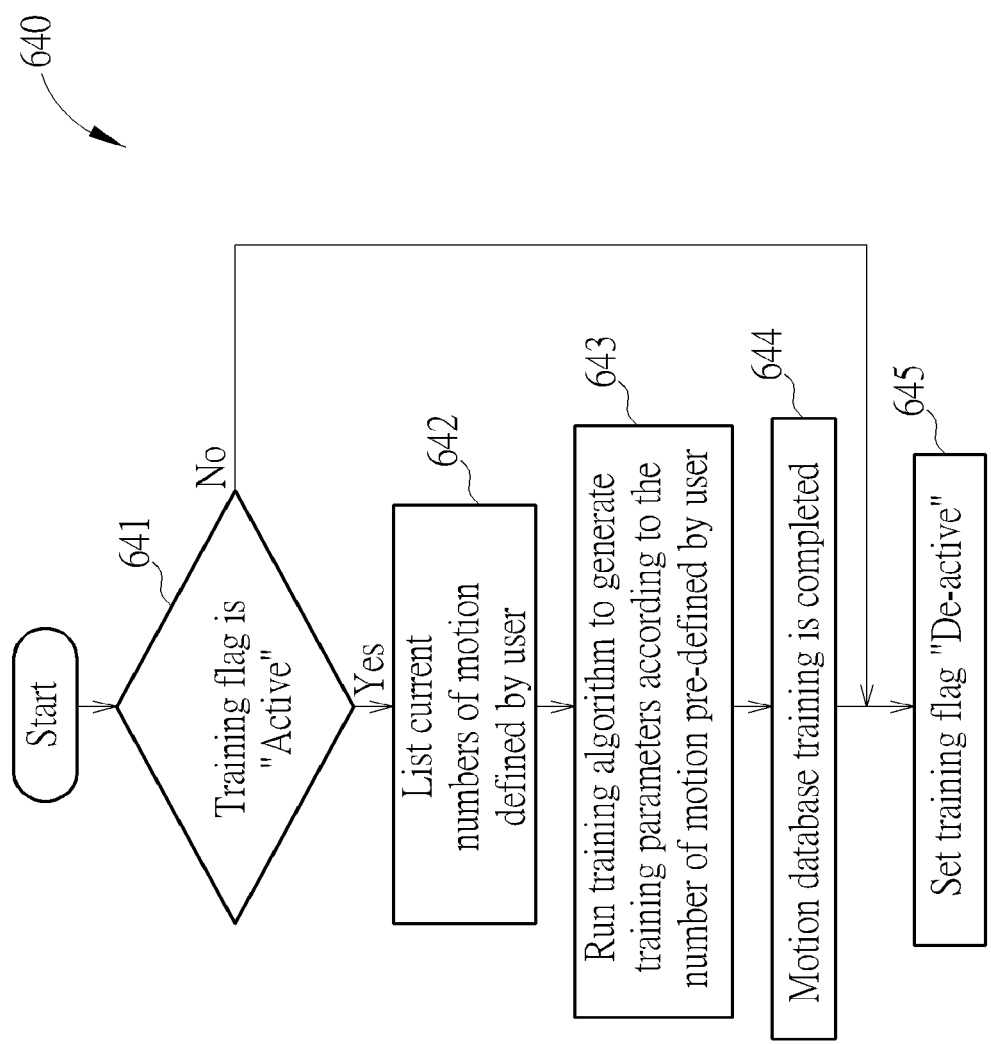
FIG. 32 is a working flow involved with the method mentioned in the embodiment shown in FIG. 4 according to another embodiment of the present invention.

FIG. 32 is a working flow 640 involved with the method mentioned in the embodiment shown in FIG. 4 according to another embodiment of the present invention, where the working flow 640 can be utilized for re-training the updated database of the embodiment shown in FIG. 31 when any motion is deleted.

In Step 641, the processor checks whether the training flag FLAG_train is set as "Active".

In Step 642, the processor lists the current numbers of motion defined by the user.

In Step 643, the processor runs the training algorithm to generate the training parameters (e.g. the weighting parameters mentioned above) according to the number of motion pre-defined by the user.

In Step 644, under control of the processor, the motion database training is completed.

In Step 645, the processor sets the training flag FLAG_train as "De-active".

Single/Multi-Stroke Character Motion Recognition

Figure 33:
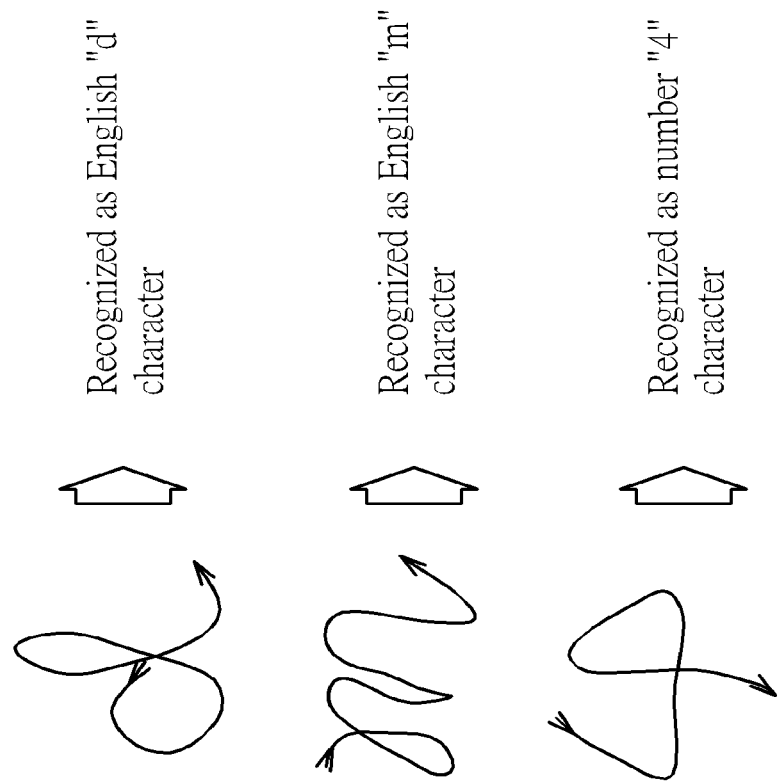
FIG. 33 illustrates some trajectories detected by single/multi-stroke character motion recognition involved with the method mentioned in the embodiment shown in FIG. 4 according to an embodiment of the present invention.
Figure 33:
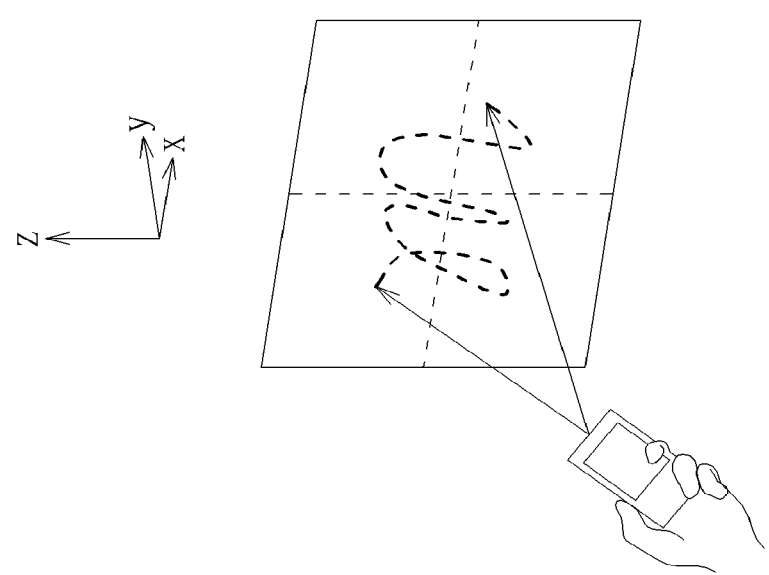
Figure 34:
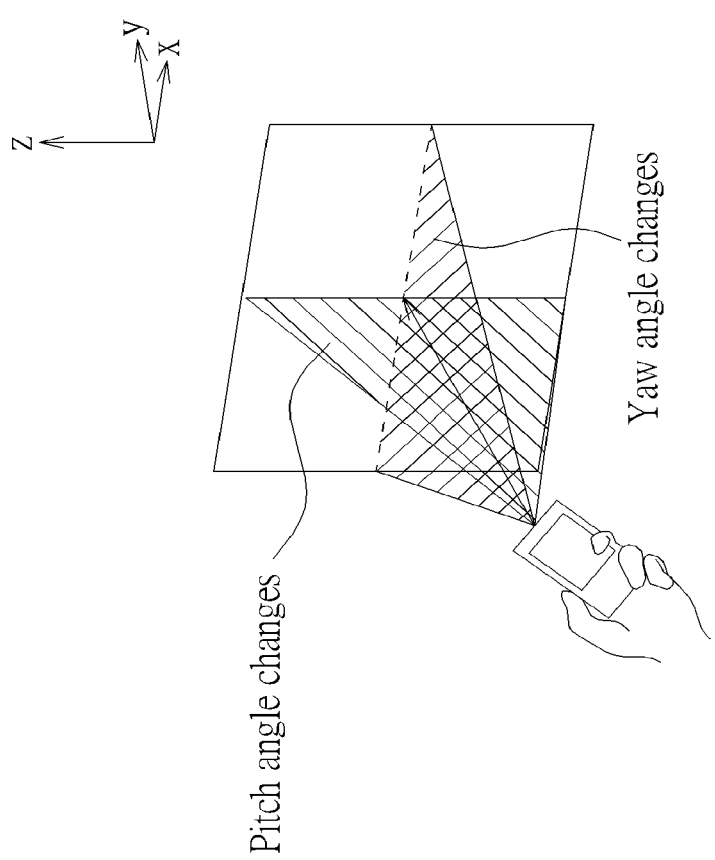
FIG. 34 illustrates hand-writing motions having pitch and yaw angle changes with respect to time and the associated projection on an XZ plane of the global coordinate system according to the embodiment shown in FIG. 33.

FIG. 33 illustrates some trajectories detected by single/multi-stroke character motion recognition involved with the method mentioned in the embodiment shown in FIG. 4 according to an embodiment of the present invention. As shown in FIG. 33, the processor can recognize the trajectory made by the user as one of the characters pre-defined in the database. For example, "d", "m", and "4" can be recognized as shown in the right half of FIG. 33. Please refer to FIG. 34, which illustrates hand-writing motions having pitch and yaw angle changes with respect to time and the associated projection on an XZ plane (e.g. the aforementioned first plane parallel to the x-z plane) of the global coordinate system according to the embodiment shown in FIG. 33. For example, in a situation where the user is facing toward the XZ plane, the single/multi-stroke character motion carried out (or drawn) by the user can be regarded as hand-writing motion having pitch and yaw angle changes with respect to time on the XZ plane.

Figure 35:
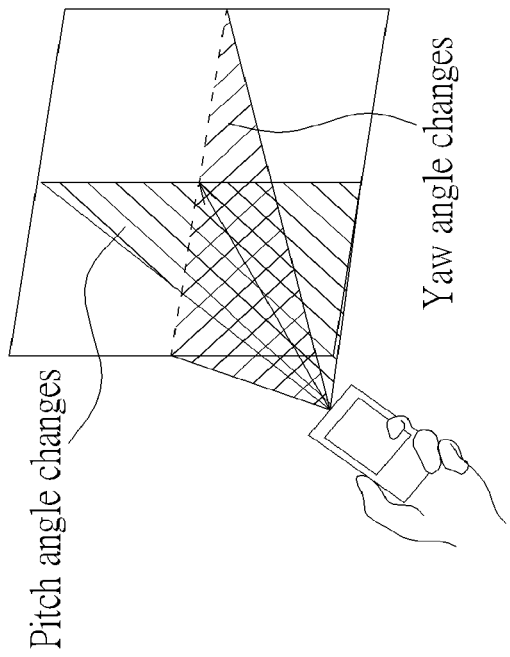
FIG. 35 illustrates the Spherical-Cartesian transformation according to the embodiment shown in FIG. 33.

FIG. 35 illustrates the Spherical-Cartesian transformation according to the embodiment shown in FIG. 33. For example, the processor is capable of performing the Spherical-Cartesian transformation according to the changes of one or more of the pitch angle and the yaw angle (e.g. the changes of the pitch angle and/or the changes of the yaw angle) to generate the data of the 3D points in the 3D space. As a result, the pitch and the yaw angle changes with respect to time can be converted into 3D points (more particularly, the data thereof) in the 3D space by Spherical-Cartesian transformation shown in FIG. 35, so that the trajectory of the hand-writing motion (or movement) can be stored into the aforementioned database, and therefore the hand-writing motion can be recognized. This is for illustrative purposes only, and is not meant to be a limitation of the present invention. According to a variation of this embodiment, the processor is capable of performing the Spherical-Cartesian transformation according to the changes of one or more of the pitch angle and the roll angle (e.g. the changes of the pitch angle and/or the changes of the roll angle) to generate the data of the 3D points in the 3D space. According to another variation of this embodiment, the processor is capable of performing the Spherical-Cartesian transformation according to the changes of one or more of the roll angle and the yaw angle (e.g. the changes of the roll angle and/or the changes of the yaw angle) to generate the data of the 3D points in the 3D space.

Figure 36:
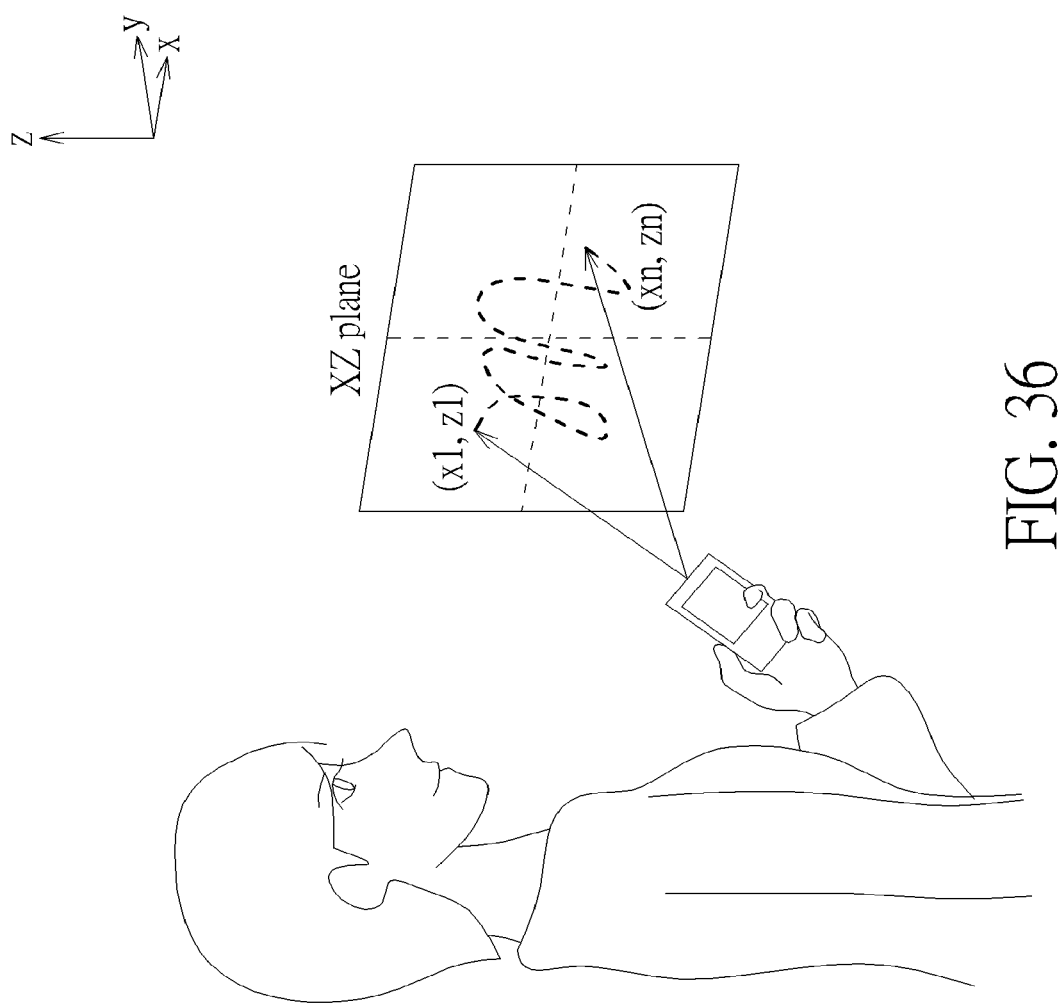
FIG. 36 illustrates trajectory data extraction corresponding to the projection on the XZ plane of the global coordinate system for the aforementioned single/multi-stroke character motion recognition of the embodiment shown in FIG. 33 according to an embodiment of the present invention.

FIG. 36 illustrates trajectory data extraction corresponding to the projection on the XZ plane (e.g. the aforementioned first plane parallel to the x-z plane) of the global coordinate system for the aforementioned single/multi-stroke character motion recognition of the embodiment shown in FIG. 33 according to an embodiment of the present invention. When the user is standing, facing toward the XZ plane, he/she can carry out the hand-writing motion as if he/she is writing onto the XZ plane, and the processor can record the 3D points of the trajectory, and then pick up (or extract) the 2D points from the 3D points, having no need to record the y-coordinates of the 3D points (i.e., the y-coordinates based on the y-axis) in this embodiment, where these 2D points respectively having the remaining coordinates {(x, z)} can be utilized for performing motion recognition.

Figure 37:
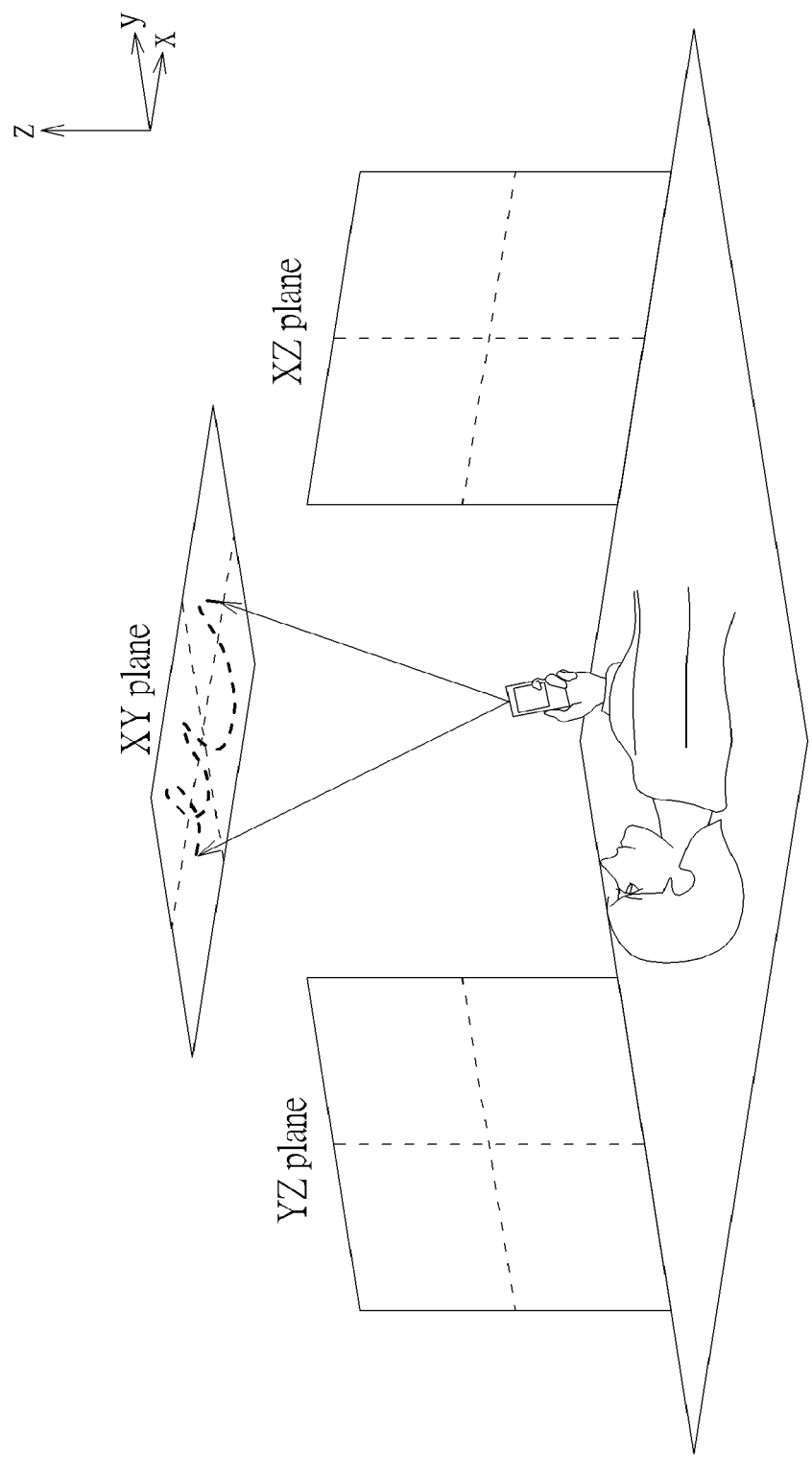
FIG. 37 illustrates trajectory data extraction corresponding to the projection on an XY plane of the global coordinate system for the aforementioned single/multi-stroke character motion recognition of the embodiment shown in FIG. 33 according to another embodiment of the present invention.

FIG. 37 illustrates trajectory data extraction corresponding to the projection on an XY plane (e.g. a third plane parallel to the x-y plane comprising the x-axis and the y-axis of the x-y-z coordinate system) of the global coordinate system for the aforementioned single/multi-stroke character motion recognition of the embodiment shown in FIG. 33 according to another embodiment of the present invention. When the user is lying down, facing toward the XY plane, he/she can carry out the hand-writing motion as if he/she is writing onto the XY plane, and the processor can record the 3D points of the trajectory, and then pick up (or extract) the 2D points from the 3D points, having no need to record the z-coordinates of the 3D points (i.e., the z-coordinates based on the z-axis) in this embodiment, where these 2D points respectively having the remaining coordinates {(x, y)} can be utilized for performing motion recognition.

According to the embodiments shown in FIG. 36 and FIG. 37, by using the 2D points extracted from the 3D points with the projection onto any of the XY plane, the XZ plane, and the YZ plane, the motion recognition (more particularly, character recognition) can be performed correctly in different situations, no matter whether the user is standing, sitting, or lying. In practice, no matter whether the user is standing or lying, the pitch angle of the electronic device can be utilized for determining the current status (e.g. the user is standing, or the user is lying), and the processor can select the predetermined plane correctly based on the detection of the current status (e.g. the user is standing, or the user is lying).

Figure 38:
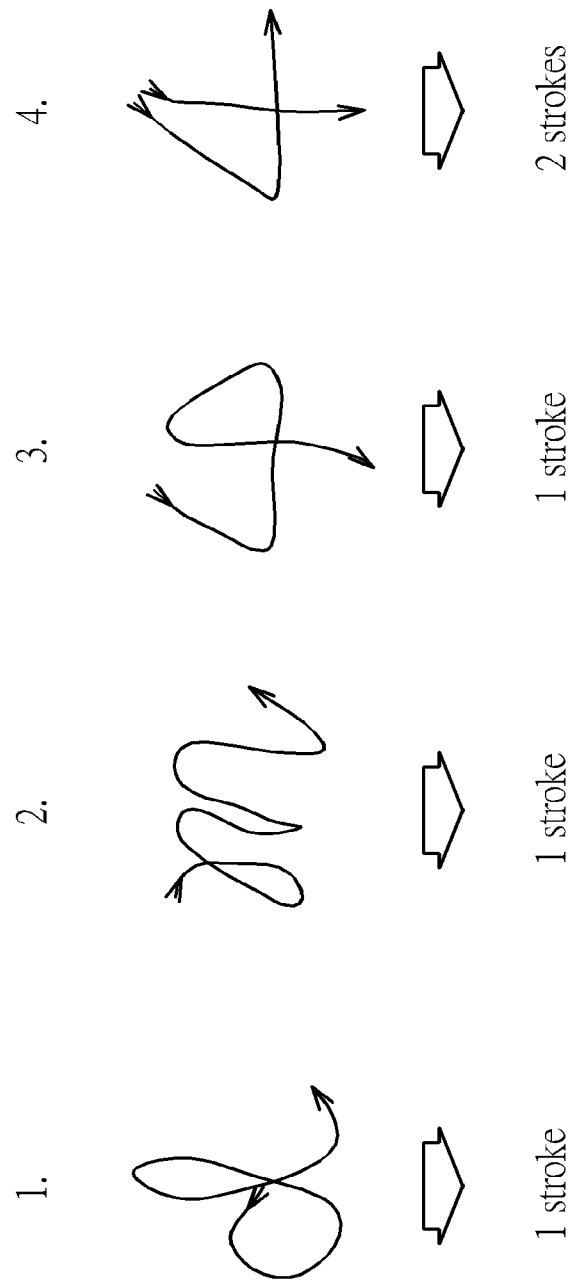
FIG. 38 illustrates some characters drawn by the user and the associated stroke counts involved with the aforementioned single/multi-stroke character motion recognition of the embodiment shown in FIG. 33 according to an embodiment of the present invention.

FIG. 38 illustrates some characters drawn by the user and the associated stroke counts involved with the aforementioned single/multi-stroke character motion recognition of the embodiment shown in FIG. 33 according to an embodiment of the present invention. The characters sometimes may comprise multi-strokes, which means it is required to provide the user with a method to write trajectories of multi-strokes characters in the 3D space. According to this embodiment, a button (for the user to press and hold, and to release) can be utilized for distinguishing separated strokes. For example, the third character shown in FIG. 38 (labeled "3.", above the character) can be introduced to the user if he/she can follow the writing order of this stroke. As a result, the user still can get the character "4" after motion recognition, without exceeding one stroke.

Figure 39:
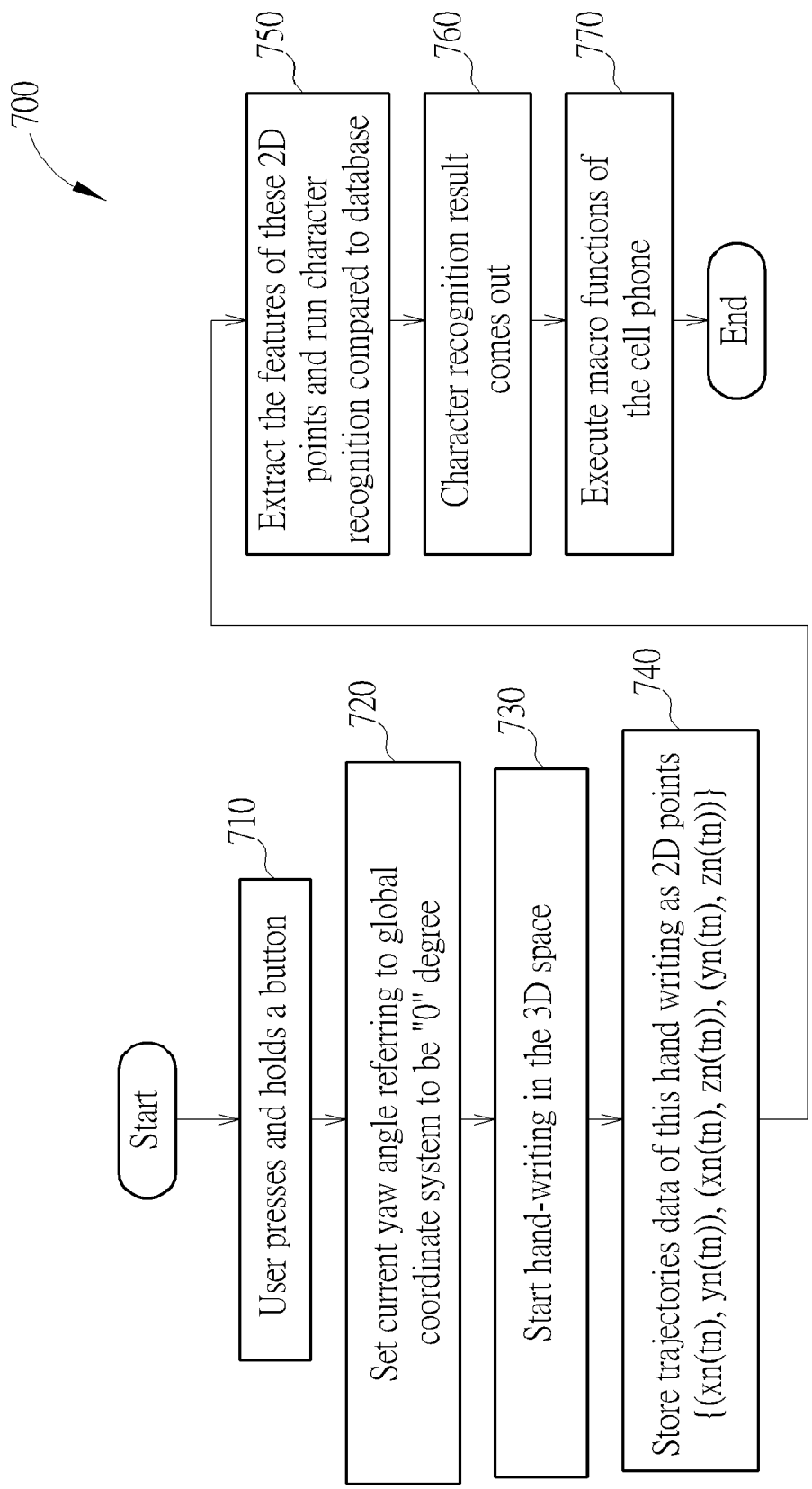
FIG. 39 is a working flow involved with the aforementioned single/multi-stroke character motion recognition of the embodiment shown in FIG. 33 according to an embodiment of the present invention.

FIG. 39 is a working flow 700 involved with the aforementioned single/multi-stroke character motion recognition of the embodiment shown in FIG. 33 according to an embodiment of the present invention.

In Step 710, the processor detects that the user presses and holds a button such as that mentioned in Step 310, and therefore the processor prepares for recording the motion and performing motion recognition, where pressing and holding this button is utilized as a command to start recording the motion to perform motion recognition.

In Step 720, the processor sets the current yaw angle referring to the global coordinate system to be zero degree (or zero).

In Step 730, the processor allows the user to start handwriting in the 3D space.

In Step 740, the processor stores the trajectories data of this hand writing as 2D points {(xn(tn), yn(tn)), (xn(tn), zn(tn)), (yn(tn), zn(tn))}, which are coordinate sets having the coordinates (x(t), y(t)), (x(t), z(t)), (y(t), z(t)), where the notation t represents time, and the notation n represents a positive integer utilized as an index for denoting the n.sup.th point (e.g. on the trajectory) corresponding to the global Cartesian coordinate, and therefore the notation tn represents a time point of a plurality of discrete time points on the time axis. Thus, the notations xn, yn, zn represent data (e.g. global Cartesian coordinate data) corresponding to the time point tn. For example, {xn(tn)} may comprise xn(tn), xn−1 (tn−1), xn−2(tn−2), . . . , .xm(tm), where m<n.

In practice, (xn(tn), yn(tn)), (xn(tn), zn(tn)), and (yn(tn), zn(tn)) may represent a set of 2D points, and more particularly, the coordinates of different locations on the trajectory under consideration. This is for illustrative purposes only, and is not meant to be a limitation of the present invention. According to some variations of this embodiment, each of (xn(tn), yn(tn)), (xn(tn), zn(tn)), and (yn(tn), zn(tn)) may represent a set of 2D points from current instant time n to previous 2D points.

In Step 750, the processor extracts the features of these 2D points and runs character recognition, for example, with the features being compared with the data in the database.

In Step 760, under control of the processor, the character recognition result comes out.

In Step 770, the processor executes at least one macro function (more particularly, a set of macro functions) of the electronic device such as the cell phone.

Figure 40:
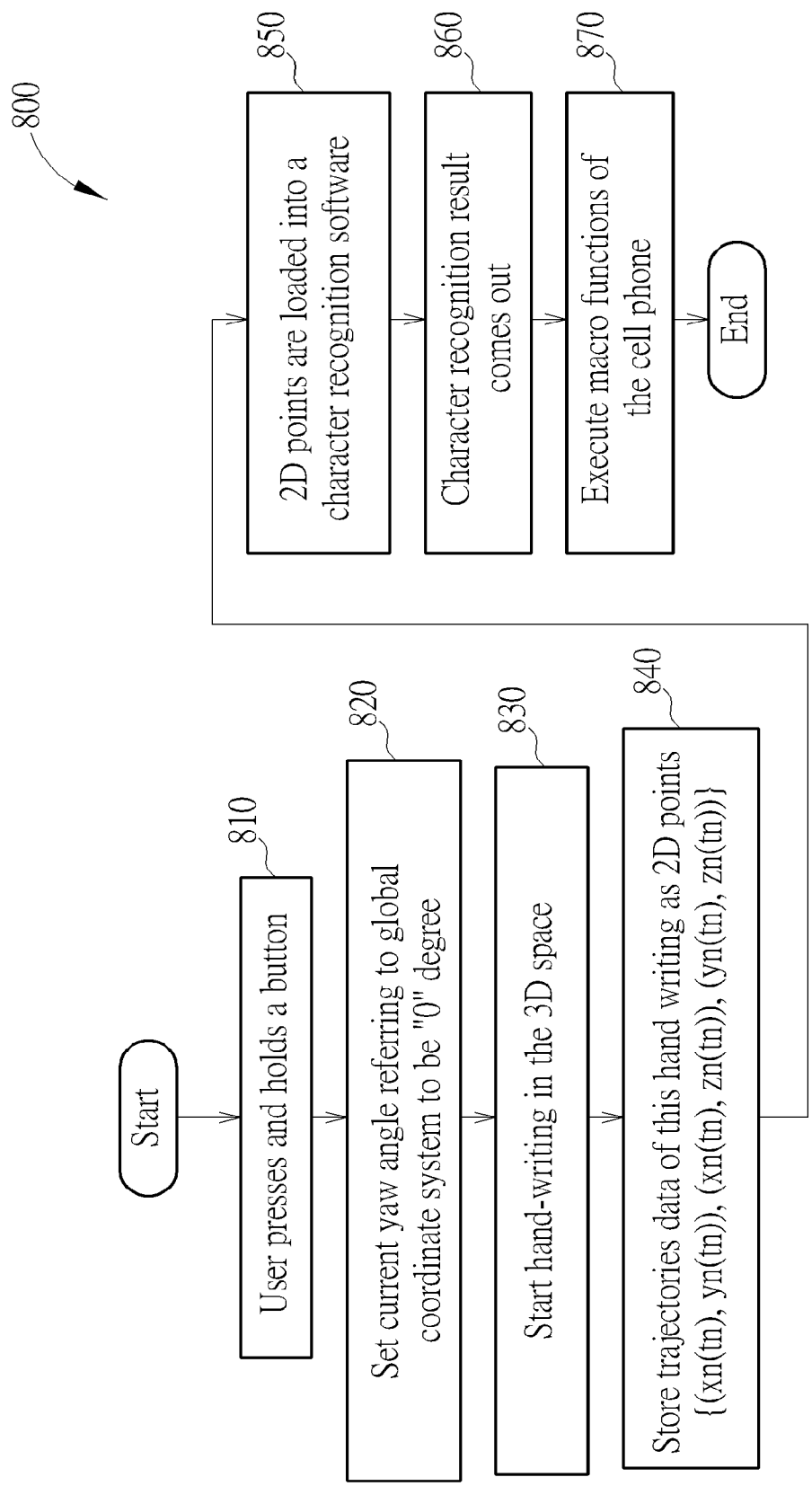
FIG. 40 is a working flow involved with the aforementioned single/multi-stroke character motion recognition of the embodiment shown in FIG. 33 according to another embodiment of the present invention.

FIG. 40 is a working flow 800 involved with the aforementioned single/multi-stroke character motion recognition of the embodiment shown in FIG. 33 according to another embodiment of the present invention.

In Step 810, the processor detects that the user presses and holds a button such as that mentioned in Step 310, and therefore the processor prepares for recording the motion and performing motion recognition, where pressing and holding this button is utilized as a command to start recording the motion to perform motion recognition.

In Step 820, the processor sets the current yaw angle referring to the global coordinate system to be zero degree (or zero).

In Step 830, the processor allows the user to start handwriting in the 3D space.

In Step 840, the processor stores the trajectories data of this hand writing as 2D points {(xn(tn), yn(tn)), (xn(tn), zn(tn)), (yn(tn), zn(tn))}, such as those disclosed above.

In Step 850, under control of the processor, the 2D points are loaded into a character recognition software, for character recognition.

In Step 860, under control of the processor, the character recognition result comes out.

In Step 870, the processor executes at least one macro function (more particularly, a set of macro functions) of the electronic device such as the cell phone.

Those skilled in the art will readily observe that numerous modifications and alterations of the device and method may be made while retaining the teachings of the invention. Accordingly, the above disclosure should be construed as limited only by the metes and bounds of the appended claims.

The invention claimed is:

1. A method performed by a processor of an electronic device configured to be held by a user, the method comprising:
   obtaining sensor data corresponding to a plurality of motion sensors of the electronic device, the sensor data being measured with respect to a device coordinate system of the electronic device, wherein the plurality of motion sensors comprises inertial motion sensors;
   performing sensor fusion according to the sensor data to obtain an orientation comprising resultant angles in a spatial reference frame of a global coordinate system, wherein the resultant angles comprise a roll angle, a pitch angle, and a yaw angle of the electronic device;
   selecting one of at least one predetermined plane based on the orientation;
   mapping the resultant angles onto the selected one of the at least one predetermined plane to obtain a trajectory on the selected one of the at least one predetermined plane; and
   performing motion recognition based on the trajectory on the selected one of the at least one predetermined plane in the spatial reference frame in order to recognize the user's motion in 3D space,
   wherein performing motion recognition further comprises:
      performing motion recognition based on the trajectory on the selected one of the at least one predetermined plane at the spatial reference frame in order to recognize at least one character drawn by the user in the 3D space;
      loading the at least one character drawn by the user in the 3D space into a character recognition software module configured to perform character recognition; and
      performing character recognition comprising resetting the yaw angle of the electronic device to a predetermined value to align the yaw angle with the user; and
   wherein, in mapping the resultant angles, the least one predetermined plane is parallel to two of three axes of the global coordinate system, and the three axes of the global coordinate system are orthogonal to each other.

2. The method of claim 1, wherein:
   the plurality of motion sensors comprises at least one rotation sensor; and
   performing the sensor fusion comprises utilizing the at least one rotation sensor.

3. The method of claim 2, wherein:
   the plurality of motion sensors comprises at least one magnetometer; and
   performing the sensor fusion comprises utilizing the at least one magnetometer.

4. The method of claim 1, further comprising:
   providing a pre-built character recognition database in the electronic device corresponding to moving rules associated with characters to be recognized.

5. The method of claim 1, further comprising:
   resetting the yaw angle of the electronic device to the predetermined value in response to a button of the electronic device being pressed.

6. The method of claim 1, further comprising:
   resetting the yaw angle of the electronic device to the predetermined value in response to detecting onset of motion.

7. The method of claim 1, further comprising:
   performing Spherical-Cartesian transformation according to changes of one or more of the pitch angle, roll angle, and the yaw angle to generate data of 3D points in the 3D space.

8. The method of claim 1, wherein:
   performing motion recognition comprises obtaining at least one motion recognition result representing the user's motion in the 3D space; and
   the method further comprises triggering at least one user-defined macro function corresponding to the at least one motion recognition result.

9. The method of claim 8, wherein:
   the method further comprises providing a user-defined gesture database in the electronic device; and
   obtaining the at least one motion recognition result comprises using the user-defined gesture database.

10. An electronic device configured to be held by a user, comprising:
   a plurality of motion sensors configured to generate sensor data measured with respect to a device coordinate system, wherein the plurality of motion sensors comprises inertial motion sensors;
   a processor having processor circuitry configured to:
   perform sensor fusion according to the sensor data to obtain an orientation comprising resultant angles in a spatial reference frame of a global coordinate system, wherein the resultant angles comprises a roll angle, a pitch angle, and a yaw angle of the electronic device;
   select one of at least one predetermined plane based on the orientation;

map the resultant angles onto the selected one of the at least one predetermined plane to obtain a trajectory on the selected one of the at least one predetermined plane;

perform motion recognition based on the trajectory on the selected one of the at least one predetermined plane in the spatial reference frame in order to recognize the user's motion in 3D space; and reset the yaw angle of the electronic device to a predetermined value to align the yaw angle with the user;

wherein, in mapping the resultant angles, the least one predetermined plane is parallel to two of three axes of the global coordinate system, and the three axes of the global coordinate system are orthogonal to each other.

11. The device of claim 10, wherein:

the plurality of motion sensors comprises at least one rotation sensor; and the processor is configured to perform the sensor fusion utilizing the at least one rotation sensor.

12. The device of claim 11, wherein:

the plurality of motion sensors comprises at least one magnetometer; and the processor is configured to perform the sensor fusion utilizing the at least one magnetometer.

13. The device of claim 10, wherein the processor is further configured to perform motion recognition based on the trajectory on the selected one of the at least one predetermined plane at the spatial reference frame in order to recognize at least one character drawn by the user in the 3D space, further comprising:

a pre-built character recognition database corresponding to drawing rules associated with characters to be recognized such that the processor accesses the pre-built character recognition database during motion recognition.

14. The device of claim 10, further comprising:

a character recognition software module configured to perform character recognition during the performing of motion recognition.

15. The device of claim 10, wherein:

in performing the motion recognition, the processor is configured to obtain at least one motion recognition result representing the user's motion in the 3D space; and the processor is further configured to trigger at least one user-defined macro function corresponding to the at least one motion recognition result.

16. The device of claim 15, wherein:

the device further comprises a user-defined gesture database; and the processor is configured to obtain the at least one motion recognition result using the user-defined gesture database.

* * * * *